US009495039B2

United States Patent
Mamba et al.

(10) Patent No.: US 9,495,039 B2
(45) Date of Patent: *Nov. 15, 2016

(54) COORDINATE INPUT DEVICE AND DISPLAY DEVICE INCLUDING THE SAME

(71) Applicants: Japan Display Inc., Tokyo (JP); Panasonic Liquid Crystal Display Co., Ltd., Hyogo (JP)

(72) Inventors: Norio Mamba, Kawasaki (JP); Koji Nagata, Hachioji (JP); Koji Hayakawa, Chosei-Chosei-gun (JP)

(73) Assignees: Japan Display Inc., Tokyo (JP); Panasonic Liquid Crystal Display Co., Ltd., Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/989,874

(22) Filed: Jan. 7, 2016

(65) Prior Publication Data

US 2016/0117054 A1 Apr. 28, 2016

Related U.S. Application Data

(63) Continuation of application No. 14/261,070, filed on Apr. 24, 2014, now Pat. No. 9,262,027, which is a (Continued)

(30) Foreign Application Priority Data

Mar. 2, 2010 (JP) .................................. 2010-044877

(51) Int. Cl.
*G09G 5/00* (2006.01)
*G06F 3/041* (2006.01)
(Continued)

(52) U.S. Cl.
CPC ............. *G06F 3/0418* (2013.01); *G06F 3/044* (2013.01); *G06F 3/047* (2013.01)

(58) Field of Classification Search
CPC ...................... G06F 3/044; G06F 3/045; G06F 2203/04107; G06F 3/0418
(Continued)

(56) References Cited

U.S. PATENT DOCUMENTS 5,374,787 A    12/1994  Miller et al.
8,730,189 B2 *  5/2014  Mamba ................... G06F 3/044
                                                    178/18.01
(Continued)

FOREIGN PATENT DOCUMENTS

JP    2005140612 A    6/2005
KR    20090004678 A    1/2009

OTHER PUBLICATIONS

European Search report for corresponding European Application No. 11150956.8 dated Apr. 15, 2015.

*Primary Examiner* — Jennifer Nguyen
(74) *Attorney, Agent, or Firm* — Typha IP LLC

(57) ABSTRACT

A coordinate input device includes: a coordinate input unit having a plurality of first detection electrodes and a plurality of second detection electrodes; an electrode drive circuit that applies a drive signal to one or more of the detection electrodes; a detection circuit that detects a signal of the first and/or second detection electrode; a selection circuit for selecting one or more of the detection electrodes to which the drive signal is not applied from among the detection electrodes which are disposed in parallel to the detection electrodes to which the drive signal is applied, as a reference electrode; a detection circuit for detecting a signal of the selected reference electrode; an input coordinate computing circuit for correcting a detection result of the detection circuit on the basis of the detected capacitance of the reference electrode and for calculating an input coordinate from the corrected detection result.

8 Claims, 16 Drawing Sheets

Related U.S. Application Data continuation of application No. 13/005,574, filed on Jan. 13, 2011, now Pat. No. 8,730,189.

(51) Int. Cl.
*G06F 3/044* (2006.01)
*G06F 3/047* (2006.01)

(58) Field of Classification Search
USPC ............................... 345/173–174; 178/18.06
See application file for complete search history.

(56) References Cited

U.S. PATENT DOCUMENTS

| | | |
|---|---|---|
| 2005/0122785 A1 | 6/2005 | Umeda et al. |
| 2006/0049834 A1 | 3/2006 | Umeda |
| 2009/0009486 A1 | 1/2009 | Sato et al. |
| 2009/0146964 A1* | 6/2009 | Park ...................... G06F 3/0416 345/173 |
| 2009/0183931 A1* | 7/2009 | Okano ................... G06F 3/044 178/18.03 |
| 2010/0060610 A1* | 3/2010 | Wu ......................... G06F 3/044 345/174 |
| 2010/0085324 A1 | 4/2010 | Noguchi et al. |
| 2011/0157069 A1* | 6/2011 | Zhuang ................... G06F 3/044 345/174 |
| 2014/0232684 A1* | 8/2014 | Mamba ................... G06F 3/044 345/174 |

* cited by examiner

FIG.12

| SCANNING PERIOD | DRIVE ELECTRODE | REFERENCE ELECTRODE (ONE) | REFERENCE ELECTRODE (TWO) |
|---|---|---|---|
| Ty1 | Y1 | Y3 | Y3,Y5 |
| Ty2 | Y2 | Y4 | Y4,Y6 |
| Ty3 | Y3 | Y5 | Y1,Y5 |
| Ty4 | Y4 | Y6 | Y2,Y6 |
| Ty5 | Y5 | Y3 | Y1,Y3 |
| Ty6 | Y6 | Y4 | Y2,Y4 |

FIG.13

| SCANNING PERIOD | DRIVE ELECTRODE | REFERENCE ELECTRODE (ONE) | REFERENCE ELECTRODE (TWO) | REFERENCE ELECTRODE (THREE) | REFERENCE ELECTRODE (FOUR) |
|---|---|---|---|---|---|
| Ty1 | Y1 | Y2 | Y2,Y3 | Y2,Y3,Y4 | Y2,Y3,Y4,Y5 |
| Ty2 | Y2 | Y3 | Y1,Y3 | Y1,Y3,Y4 | Y1,Y3,Y4,Y5 |
| Ty3 | Y3 | Y4 | Y2,Y4 | Y2,Y4,Y5 | Y1,Y2,Y4,Y5 |
| Ty4 | Y4 | Y5 | Y3,Y5 | Y3,Y5,Y6 | Y2,Y3,Y5,Y6 |
| Ty5 | Y5 | Y6 | Y4,Y6 | Y3,Y4,Y6 | Y2,Y3,Y4,Y6 |
| Ty6 | Y6 | Y5 | Y4,Y5 | Y3,Y4,Y5 | Y2,Y3,Y4,Y5 |

COORDINATE INPUT DEVICE AND DISPLAY DEVICE INCLUDING THE SAME

CROSS-REFERENCE TO RELATED APPLICATION

This application is a Continuation of U.S. application Ser. No. 14/261,070, filed on Apr. 24, 2014, which is also a Continuation of U.S. application Ser. No. 13/005,574 (now U.S. Pat. No. 8,730,189), filed on Jan. 13, 2010, the contents of which are incorporated herein by reference.

The present application claims the priority from Japanese application No. 2010-0044877 filed on Mar. 2, 2010, the content of which is hereby incorporated by reference into this application.

BACKGROUND OF THE INVENTION

1. Field of the Invention

The present invention relates to a coordinate input device that detects an indication point on a screen, and a display apparatus having the same. More particularly, it is relates to a technique which is effective in increasing the coordinate detection precision of a display apparatus having a capacitive coupling type coordinate input device.

2. Description of the Related Art

A display apparatus having a detection device (hereinafter, also called a touch sensor or a touch panel) having a screen input function for inputting information by a touch operation (contact pressing operation, hereinafter, simply called a touch) using a finger or the like of a user on the display screen is used for mobile electronic devices such as PDAs and portable terminals, various electronic appliances, and stationary customer guide terminals such as unattended reception machines. As such a touch input device, a resistive type that detects a change in resistance of a touched portion, a capacitive coupling type that detects a change in capacitance, an optical sensor type that detects a change in light intensity of a portion blocked by a touch, and the like are known.

In such types, recently, a capacitive coupling type touch panel has been spotlighted. In a case where a touch is input to an input device using a button, a slider, or the like displayed on a display apparatus of a mobile electronic device, the input device needs to be disposed on the front surface of a display panel. In this case, an input function needs to be incorporated therein while maintaining a display image quality by minimizing a reduction in display luminance of the display apparatus. Here, in general, the resistive or the optical sensor type has a low transmittance of about 80%; however, the capacitive coupling type has a high transmittance of about 90%. Accordingly, the capacitive coupling type is advantageous in that the display image quality is not degraded. In addition, the resistive type senses a touch position by a mechanical contact of a resistance film. Therefore, the number of touches (mechanical contact) is increased, and the resistance film may be deteriorated or broken, so that there is a problem in that detection errors increase or detection failures may occur. On the other hand, the capacitive coupling type has no mechanical contact such as the contact of a detection electrode with other electrodes, and thus is advantageous in terms of durability.

As a capacitance detection circuit in the capacitive coupling type, for example, a type is disclosed in JP2005-140612 A. In the disclosed type, a sensor unit having a plurality of row wires and a plurality of intersecting column wires detects the capacitance existing in the vicinity of intersections thereof. When the pitch between the row wires and the column wires is reduced, fingerprint detection can be performed by detecting a change in capacitance that occurs due to unevenness of a surface of a fingerprint. On the other hand, as the sensor unit is made transparent and to have the same size as a screen of a display panel, a coordinate input device using a finger or the like as input means can be implemented. Capacitance detection is performed by applying a drive signal to the row wires sequentially selected from among the plurality of row wires from a row wire driving unit, and detecting a current flowing via the capacitance in the vicinity of an intersection between the row wire to which the drive signal is applied and the column wire, by using a capacitance detection circuit. Here, the capacitance detection circuit detects a capacitance on the basis of the difference of two detection current results. In the disclosed type, two means are disclosed for enhancing the capacitance detection precision by reducing external noise.

In the first means, from among column electrodes intersecting row electrodes that apply the drive signal, the column electrode which initially detects the capacitance in the vicinity of an intersection thereof compares the detected current to a reference current flowing through a reference capacitance of the capacitance detection circuits and calculates a capacitance, thereby enhancing the capacitance detection precision. The capacitance detection of the column electrode thereafter is performed by obtaining the difference between the detection currents of the adjacent column electrodes. In a case where capacitance detection of the row electrodes is performed after detecting the capacitances of all the column electrodes, the above-described operation is repeated.

In the second means, one is selected as a capacitance detection object from among the column electrodes to detect the detection current flowing through the corresponding column electrode, and the second detection current flowing through a plurality of the column electrodes excluding the corresponding column electrode is regarded as a reference current. Here, capacitances in the vicinities of the intersections thereof are detected by differences between the detection currents which are capacitance detection objects and the reference current.

SUMMARY OF THE INVENTION

Here, the capacitance detection precision in a case where a sensor unit of a coordinate input device is transparent and a display panel is installed under the sensor unit will be described.

A plurality of scanning lines and a plurality of signal lines that supply an image signal to pixels on the selected scanning lines exist on a screen of the display panel. Insulators exist between the signal lines and the scanning lines on the screen of the display panel and between row electrodes and column electrodes in the sensor unit of the coordinate input device, so that parasitic capacitance occurs.

Here, a scanning signal used to rewrite an image is applied to the scanning line, and the corresponding image signal voltage is applied to the signal line used to rewrite the image of the selected scanning line. Accordingly, in the row electrodes or the column electrodes of the sensor unit which is coupled to the scanning lines or the signal lines via parasitic capacitance, charge or discharge currents that occur due to a change in image signal voltage of scanning signal voltage are incorporated as noise.

Here, in a method using a reference capacitance disclosed as the first means in JP2005-140612 A, when the capacitance in the vicinity of the intersection of the first column electrode is detected, the capacitance is calculated by the difference between a detection current of the first column electrode and a reference current that flows through a reference capacitance that a capacitance detection circuit holds. In this case, noise is not incorporated from the display panel to the reference current. On the other hand, noise is incorporated to the first column electrode, so that the capacitance value corresponding to the first column electrode obtained by the difference between the two is a value into which a noise component is incorporated. The noise component from the display panel sequentially changes due to a displayed image or the like and thus varies in the row electrodes driving. Therefore, the detection precision of the detected capacitance value is degraded, so that the input coordinate precision based on the calculation is also degraded.

In addition, in the method disclosed as the second means in JP2005-140612A for regarding the current of the plurality of the column electrodes excluding the column electrode which is the capacitance detection object as the reference current, since noise is incorporated from the display panel to both the detection current and the reference current, the noise from the display panel can be reduced by calculating the difference. Here, in a case where a change in capacitance occurs due to an input to the plurality of the column electrodes which detect the reference current, the reference current is changed. Accordingly, in the case where the reference current is changed due to an existence of an input or a change in an input space, the capacitance detection result is changed due to the difference, so that it is difficult to always detect the capacitance with good precision.

As described above, in the existing coordinate input device, it is difficult to always detect the capacitance with good precision by reducing random noise incorporated from the display panel, unfortunately.

Therefore, an object of the invention is to provide a technique capable of enhancing the capacitance detection precision by reducing random noise incorporated from a display panel.

(1) In order to solve the problem, a coordinate input device includes: a coordinate input unit having a plurality of first detection electrodes and a plurality of second detection electrodes intersecting the first detection electrodes; an electrode drive circuit that applies a drive signal to one or more of the first and/or second detection electrodes; a capacitance detection circuit that detects a capacitance of the first and/or second detection electrode in synchronization with the drive signal; means for selecting one or more of the detection electrodes to which the drive signal is not applied from among the detection electrodes which are disposed in parallel to the detection electrodes to which the drive signal is applied, as a reference electrode; means for detecting a capacitance of the selected reference electrode; means for correcting a capacitance detection result of the capacitance detection circuit on the basis of the detected capacitance of the reference electrode; and an input coordinate computing circuit that calculates an input coordinate from the corrected capacitance detection result.

(2) In order to solve the problem, a display apparatus includes: a display panel that displays an image based on an image signal from an external system; and a coordinate input device disposed on the display surface side of the display panel, wherein the coordinate input device includes a coordinate input unit in which a plurality of first detection electrodes and a plurality of second detection electrodes intersecting the first detection electrodes are formed, and which is disposed on the display surface side of the display panel, an electrode drive circuit that applies a drive signal to one or more of the first and/or second detection electrodes, a capacitance detection circuit that detects a capacitance of the first and/or second detection electrode in synchronization with the drive signal, means for selecting one or more of the detection electrodes to which the drive signal is not applied from among the detection electrodes which are disposed in parallel to the detection electrodes to which the drive signal is applied, as a reference electrode, means for detecting a capacitance of the selected reference electrode, means for correcting a capacitance detection result of the capacitance detection circuit on the basis of the detected capacitance of the reference electrode, and an input coordinate computing circuit that calculates an input coordinate from the corrected capacitance detection result.

According to the invention, random noise incorporated from the display panel can be reduced, thereby enhancing the capacitance detection precision.

The other advantages of the invention will be more apparent from the entire description.

BRIEF DESCRIPTION OF THE DRAWINGS

FIG. 12 is a diagram for explaining another selection method of the reference electrode used in the coordinate input device according to the first embodiment of the invention.

FIG. 13 is a diagram for explaining another selection method of the reference electrode used in the coordinate input device according to the first embodiment of the invention.

DETAILED DESCRIPTION OF THE INVENTION

Hereinafter, exemplary embodiments of the invention will be described with reference to the accompanying drawings. It should be noted that, throughout the drawings for describing the embodiments, the components which have identical or similar functions are denoted by the same reference symbols, and the repetitive description thereof is omitted.

First Embodiment

Entire Configuration

Figure 1:
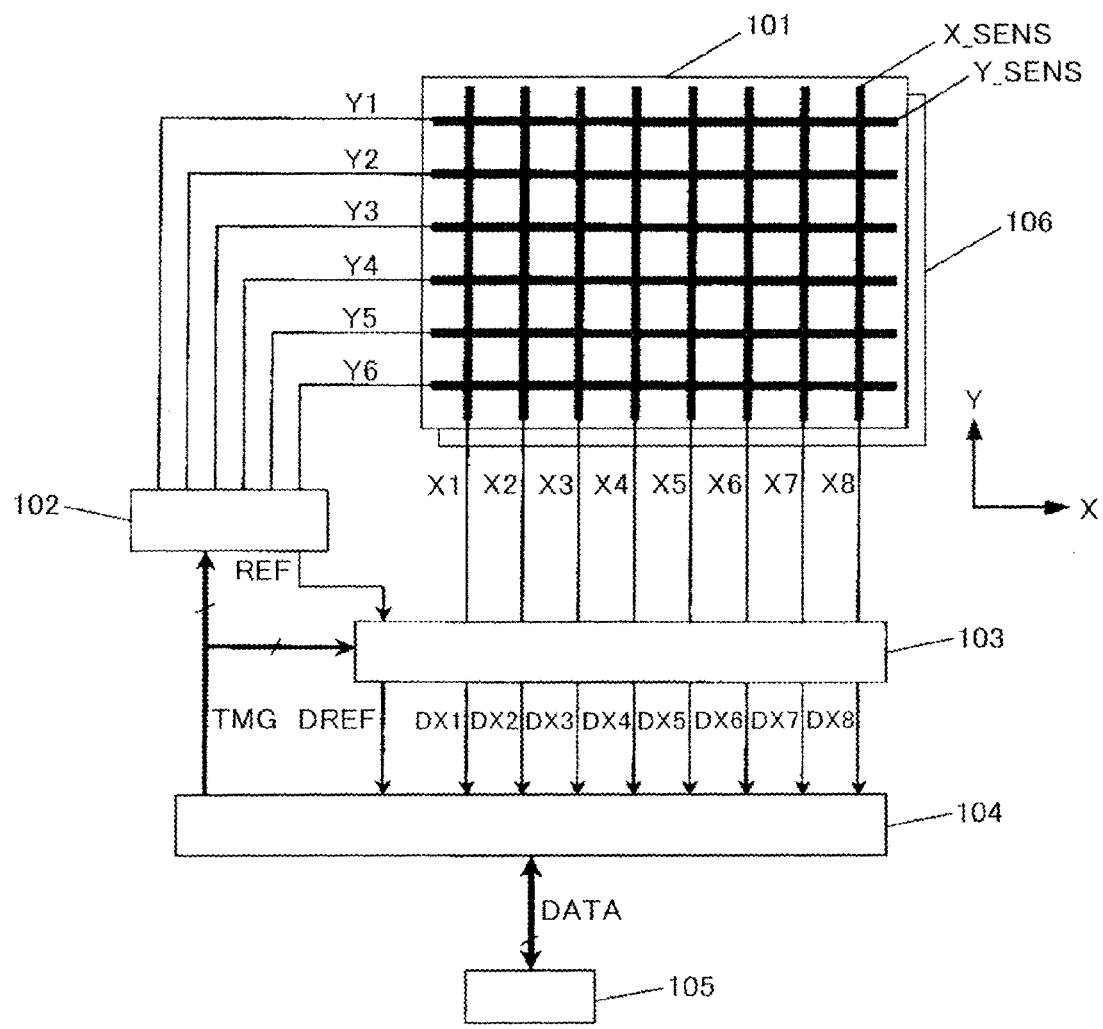
FIG. 1 is a block diagram for explaining the entire configuration of a display apparatus according to a first embodiment of the invention.

FIG. 1 is a block diagram for explaining the entire configuration of a display apparatus according to a first embodiment of the invention. Hereinafter, the entire configuration of the display apparatus according to the first embodiment will be described with reference to FIG. 1. Here, since a configuration of the display panel is the same as that of a display panel according to the related art, a coordinate input device will be described in detail in the following description. In addition, x and y in the figure represent x and y axes. Moreover, the display panel according to the first embodiment may be any one of non-light-emitting display panels such as a liquid crystal display panel and self-light-emitting display panels such as an organic EL display panel.

As illustrated in FIG. 1, the display apparatus according to the first embodiment includes a display panel 106 that displays an image based on display data (not shown) input from a system 105 which is an external apparatus, and a coordinate input device having a coordinate input unit 101 disposed on the display surface side of the display panel 106. The coordinate input device includes the coordinate input unit 101 that indicates an input position, a selective electrode drive circuit 102 needed to detect input coordinates, a capacitance detection circuit 103, and an input coordinate computing circuit 104. Data DATA such as the input coordinates detected by the coordinate input device is output to the system 105 of an apparatus including the coordinate input device and the display apparatus using the same, and the system 105 displays display contents or the like corresponding to an input on the display panel 106. In addition, in a case where the display apparatus 106 is installed under the coordinate input unit 101, that is, on the rear surface side thereof, it is preferable that the coordinate input unit 101 be transparent such that image contents displayed on the display apparatus 106 are seen by an operator.

In order to detect coordinates due to an input, the coordinate input unit 101 of the first embodiment includes a plurality of detection electrodes (second detection electrodes) X_SENS extending in a y direction in parallel to an x direction, and a plurality of selective electrodes (first detection electrodes) Y_SENS extending in the x direction in parallel to the y direction. The detection electrodes X_SENS and the selective electrodes Y_SENS intersect. In order to increase a transmitting property of the coordinate input unit 101, it is preferable that the detection electrodes X_SENS and the selective electrodes Y_SENS be transparent. In addition, in FIG. 1, a case where the number of selective electrodes Y_SENS is 6, and the number of detection electrodes X_SENS is 8 is illustrated; however, the number of electrodes is not limited thereto.

The selective electrode drive circuit 102 according to the invention is connected to the selective electrodes Y_SENS with selective electrode wires Y1 to Y6. The selective electrode drive circuit 102 selects one or more from among the plurality of selective electrodes Y_SENS by a timing control signal group TMG output from the input coordinate computing circuit 104 and sequentially applies the drive signal. In addition, the selective electrode drive circuit 102 selects one or more from among the selective electrodes Y_SENS to which the drive signal is not applied as reference electrodes, and connects it or them to a reference signal wire REF.

In addition, the capacitance detection circuit 103 is also controlled by the timing control signal group TMG. The capacitance detection circuit 103 detects two types of signals including a signal from the selective electrode Y_SENS selected by the selective electrode drive circuit 102 as the reference electrode and a signal that is changed by the capacitance in the vicinity of an intersection between the selective electrode Y_SENS to which the drive signal is applied by the selective electrode drive circuit 102 and the plurality of detection electrodes X_SENS. The signal from the reference electrode and the signal changed by the capacitance in the vicinity of the intersection are respectively input to the capacitance detection circuit 103 via the reference signal wire REF and detection electrode wires X1 to X8. That is, the signal input from the reference electrode selected by the selective electrode drive circuit 102 is input to the capacitance detection circuit 103. The capacitance detection circuit 103 generates digital output signals DREF and DX1 to DX8 from the signals input via the reference signal wire REF and the detection signal wires X1 to X8 so as to be output to the input coordinate computing circuit 104.

The input coordinate computing circuit 104 calculates a correction amount that cancels noise components from the digital output signal DREF, calculates input coordinates from data obtained by cancelling the noise components from the digital output signals DX1 to DX8, and outputs the obtained input coordinates to the system 105.

[Configuration of Selective Electrode Drive Circuit]

Figure 2:
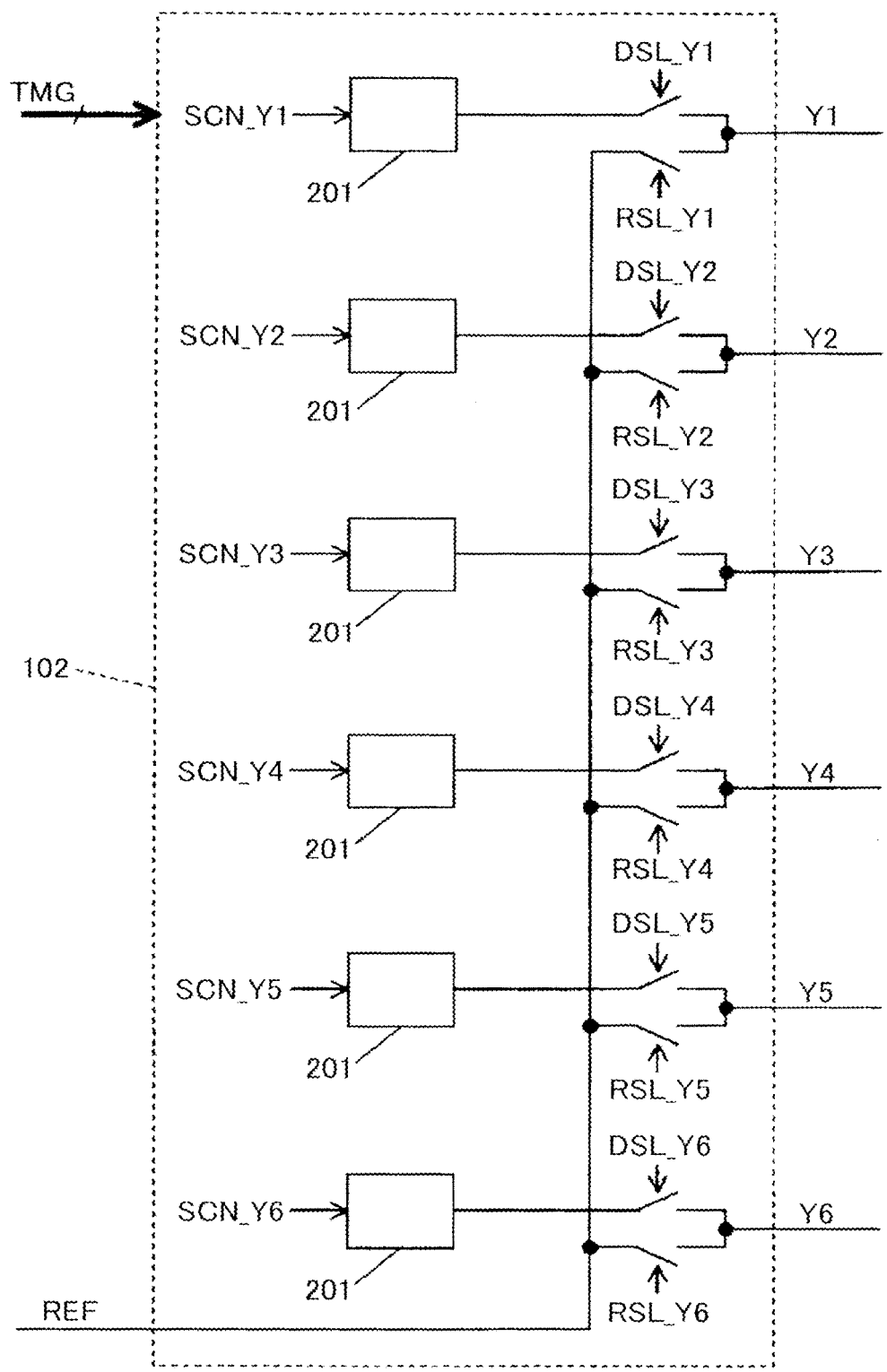
FIG. 2 is a diagram for explaining a schematic configuration of a selective electrode drive circuit in the display apparatus according to the first embodiment of the invention.

FIG. 2 is a diagram for explaining a schematic configuration of the selective electrode drive circuit in the display apparatus according to the first embodiment of the invention. Hereinafter, the selective electrode drive circuit will be described with reference to FIG. 2.

As illustrated in FIG. 2, the selective electrode drive circuit 102 according to the first embodiment includes a plurality of drive circuits 201 that selects one or more from among the plurality of selective electrodes Y_SENS and applying the drive signal to the selected selective electrodes, control switches DSL_Y1 to DSL_Y6, and control switches RSL_Y1 to RSL_Y6 that selects the selective electrodes Y_SENS as the reference electrodes. The drive circuit 201 outputs the drive signal at periods (hereinafter, referred to as timing periods) that can be detected by selective timing signals SCN_Y1 to SCN_Y6 included in the timing control signal group TMG. Here, the drive signal output from the drive circuit 201 in the scanning periods may be a voltage drive signal or a current drive signal. In addition, the drive signal output may be output once or a plurality of times in the signal scanning period. Moreover, it is preferable that an arbitrary constant voltage be applied by the drive circuits 201 to the selective electrodes to which the drive signal is not applied.

As such, the selective electrode drive circuit 102 sequentially drives the selective electrodes Y_SENS of the coordinate input unit 101 by the drive circuits 201. On the other hand, one or more of the selective electrodes Y_SENS to which the drive signal is not applied by the drive circuits 201 are selected by the control switches RSL as the reference electrodes. Here, the control switches DSL corresponding to the selective electrodes Y_SENS selected as the reference electrodes are on a non-selected state. The reference electrodes selected by the control switches RSL are connected to the reference signal wire REF, and the signals detected from the selected reference electrodes are output to the reference signal wire REF.

[Configuration of Capacitance Detection Circuit]

Figure 3:
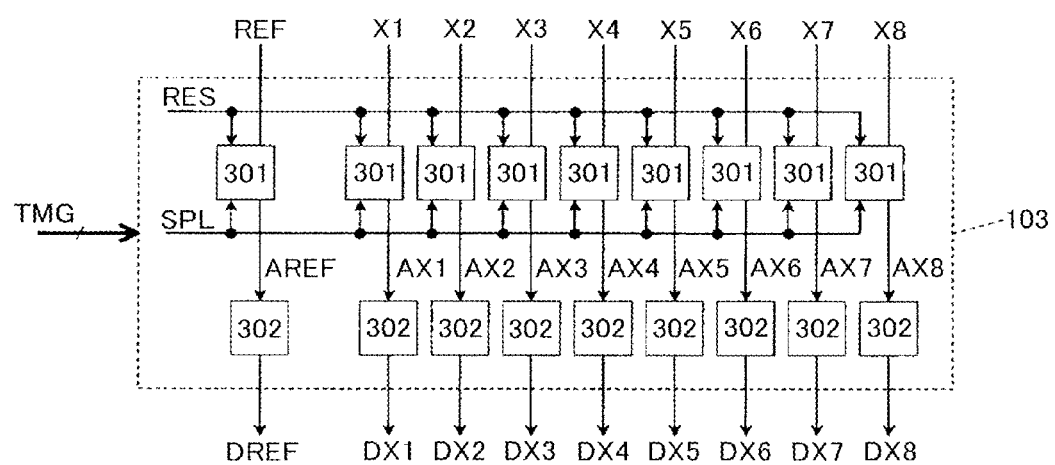
FIG. 3 is a diagram for explaining a schematic configuration of a capacitance detection circuit in the display apparatus according to the first embodiment of the invention.

FIG. 3 is a diagram for explaining a schematic configuration of the capacitance detection circuit in the display apparatus according to the first embodiment of the invention. Hereinafter, the capacitance detection circuit will be described with reference to FIG. 3.

As illustrated in FIG. 3, the capacitance detection circuit 103 includes signal detection circuits 301 that detects signals input via the reference signal wire REF and the detection signal wires X1 to X8, and AD conversion circuit 302 that converts analog output signals AREF and AX1 to AX8 output from the signal detection circuits 301 into digital signals DREF and DX1 to DX8. The signal detection circuits 301 are reset by a reset control signal RES included in the timing control signal group TMG before detecting the signals. Thereafter, at a period at which the selective electrode drive circuit 102 applies the drive signal to the selective electrode, the signals transmitted via the reference signal wire REF and the detection electrode wires X1 to X8 are detected. Here, A voltage or a current transmitted from each electrode may be detected by the signal detection circuit 301. The signal detection circuit 301 samples and holds the analog signal detected by the period at which the drive signal is applied to the selective electrode at a timing of a sampling control signal SPL and outputs the sampled and held analog signals to the AD conversion circuits 302 as the analog output signals AREF and AX1 to AX8. The AD conversion circuits 302 converts the analog output signals AREF and AX1 to AX8 into digital output signals DREF and DX1 to DX8 to be output to the input coordinate computing circuit 104.

[Basic Operations for Noise Reduction]

Figure 4:
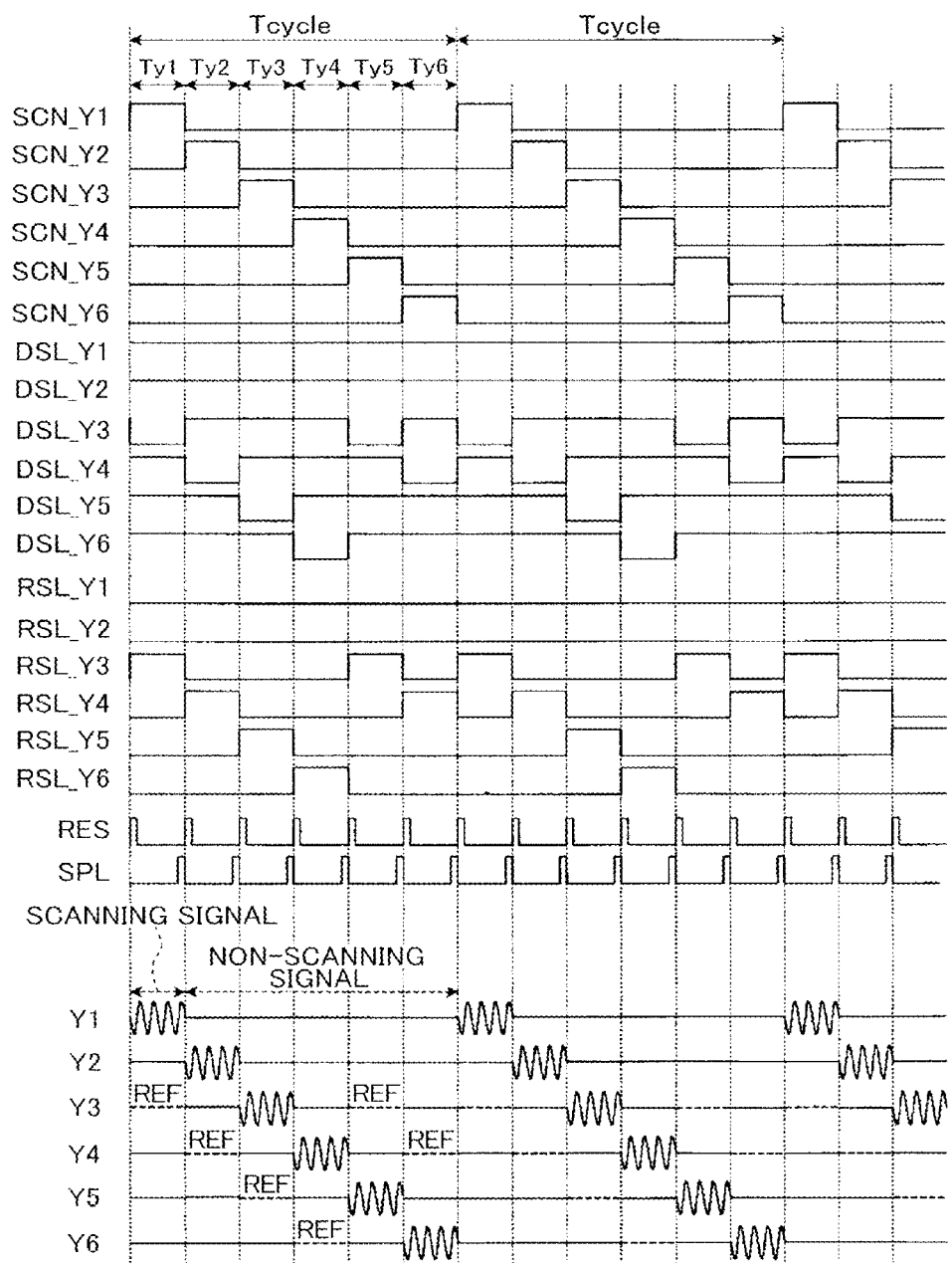
FIG. 4 is a timing chart of voltage waveforms of selective electrodes Y_SENS and control signals included in a timing control signal group TMG in the display apparatus according to the first embodiment of the invention.

FIG. 4 is a timing chart of voltage waveforms of the selective electrodes Y_SENS and control signals included in the timing control signal group TMG in the display apparatus according to the first embodiment of the invention. Hereinafter, operations of the coordinate input device according to the first embodiment will be described with reference to FIG. 4. Here, in the following description, a case where one of selective electrodes is selected for applying the drive signal in each of scanning periods Ty1 to Ty6 is described; however, the plurality of selective electrodes may be selected for applying the drive signal in each of the scanning periods Ty1 to Ty2. In addition, in FIG. 4, in the coordinate input unit 101 of FIG. 1, the case where the drive signal is sequentially input to the selective electrodes Y_SENS from the upper side of the figure toward the lower side of the figure. Therefore, in a case where the drive signal is sequentially input to the selective electrodes Y_SENS from the lower side of the figure to the upper side of the figure, the drive switch control signals DSL_Y1 to DSL_Y6 and the reference switch control signals RSL_Y1 to RSL_Y6 are applied in the reverse order.

As illustrated in FIG. 4, the coordinate input device according to the first embodiment sequentially selects the selective electrodes Y_SENS in a first cycle Tcycle and applies the drive signal thereto. In selection timing signals SCN_Y1 to SCN_Y6 illustrated in FIG. 4, a High-level period is a scanning period at which the drive signal is applied, and a Low-level period is a non-scanning period at which a certain constant voltage is applied. Here, the selective electrode Y1 is selected and the drive signal is applied thereto in the scanning period Ty1, and from the scanning periods Ty2, the drive signal is sequentially applied the selective electrodes, thereby applying the drive signal to the entire selective electrodes. On the other hand, the reference switch control signals RSL_Y1 to RSL_Y6 select one from among the plurality of selective electrodes Y_SENS, to which the drive signal is not applied, as the reference electrode in each of the scanning periods Ty1 to Ty6.

For example, in the scanning period Ty1, the drive signal is applied to the selective electrode Y1, and the selective electrode Y3 is selected as the reference electrode. In addition, in the scanning period Ty2, the drive signal is applied to the selective electrode Y2, and the selective electrode Y4 is selected as the reference electrode. Here, in FIG. 4, there is a space of one selective electrode between the selective electrode Y_SENS selected as the reference electrode and the selective electrode to which the drive signal is applied; however, a position of the reference electrode is not limited to this and may be adjacent. Here, one of the drive switch control signals DSL_Y1 to DSL_Y6 corresponding to the selective electrode selected as the reference electrode is in the non-selected state. In FIG. 4, it is illustrated that the drive switch control signals DSL_Y1 to DSL_Y6 at the High level are in the selected state as the reference signal, and the drive switch control signals DSL_Y1 to DSL_Y6 at the Low level are in the non-selected state.

During the operations described above, in the scanning period Ty1, the drive signal is applied to the selective electrode Y1, and the selective electrode Y3 is in a state connected to the reference signal wire REF selected for the reference electrode. In addition, the other selective electrodes Y2 and Y4 to Y6 are in the non-scanning state of being applied with a certain constant voltage from the drive circuits 201. That is, in the scanning period Ty1, a scanning signal (illustrated on the lower side of FIG. 4) which is an alternating current signal is applied to the selective electrode Y1, and a signal input to the selective electrode Y3 is output as a reference signal from the selective electrode Y3. At the next scanning period Ty2, similarly, the drive signal is applied to the selective electrode Y2, and the selective electrode Y4 is selected as the reference electrode to be in the state of being connected to the reference signal wire REF. The other selective electrodes Y1, Y3, and Y5 and Y6 are in the non-scanning state of being applied with a certain constant voltage from the drive circuits 201.

The above-described operations are performed on the selective electrodes Y1 to Y4, and in the first embodiment, the drive signal is sequentially applied from the selective electrode Y1 disposed on the upper side of the coordinate input unit toward the selective electrode Y6 disposed on the lower side. Therefore, the selective electrode Y3 is selected as the reference electrode for the selective electrode Y5 close to the lower end side, and the selective electrode Y4 is selected as the reference electrode for the selective electrode Y6 at the lower end.

By repeating the above-described operations sequentially, in the first cycle Tcycle including the scanning periods Ty1 to Ty6, the drive signal is sequentially applied to the selective electrodes, and simultaneously, the reference electrode is selected from the electrodes to which the drive signal is not applied.

Figure 5:
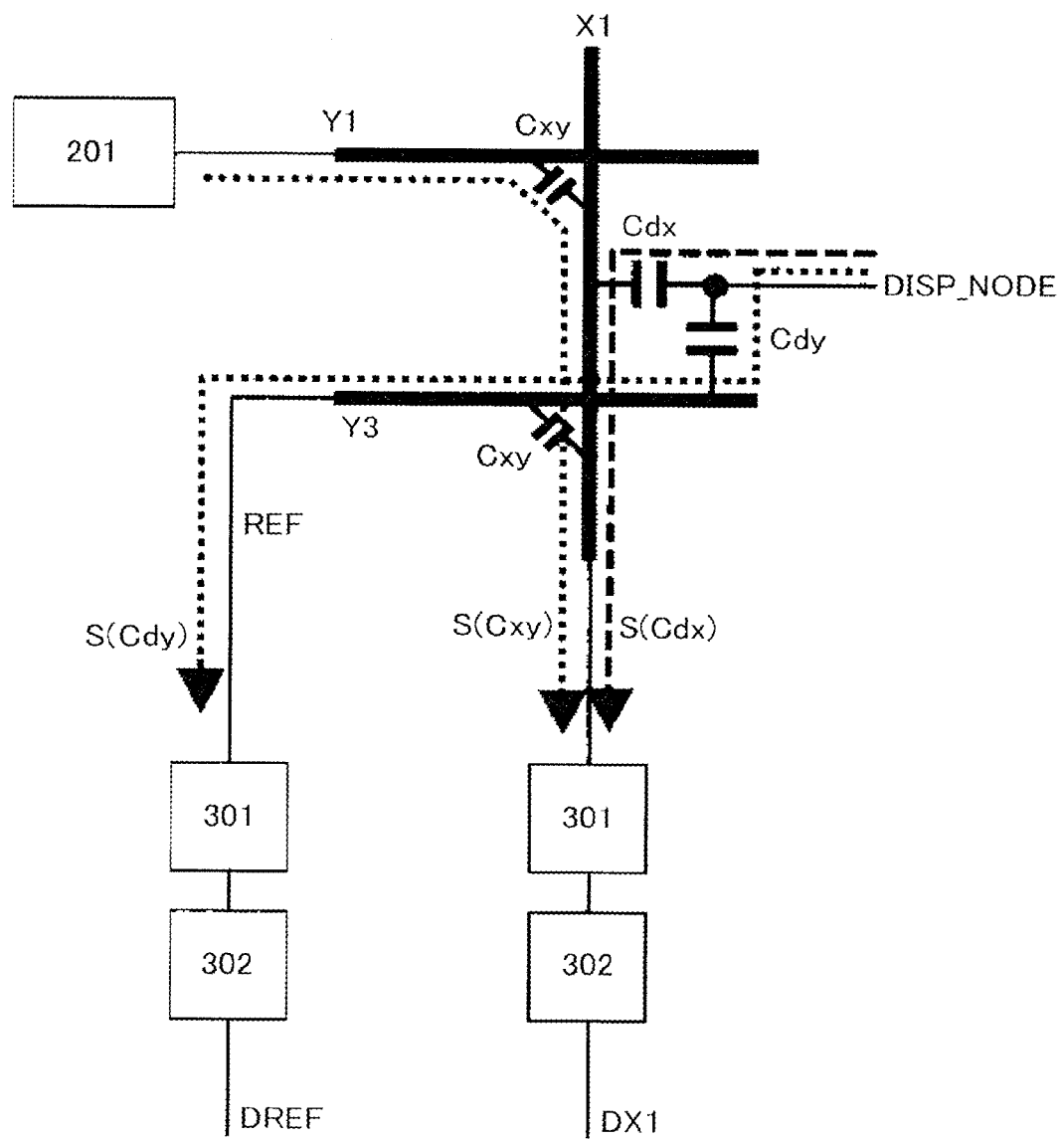
FIG. 5 is a schematic diagram of a case where a contact of a finger or the like does not exist in a coordinate input device according to the first embodiment of the invention.
Figure 6:
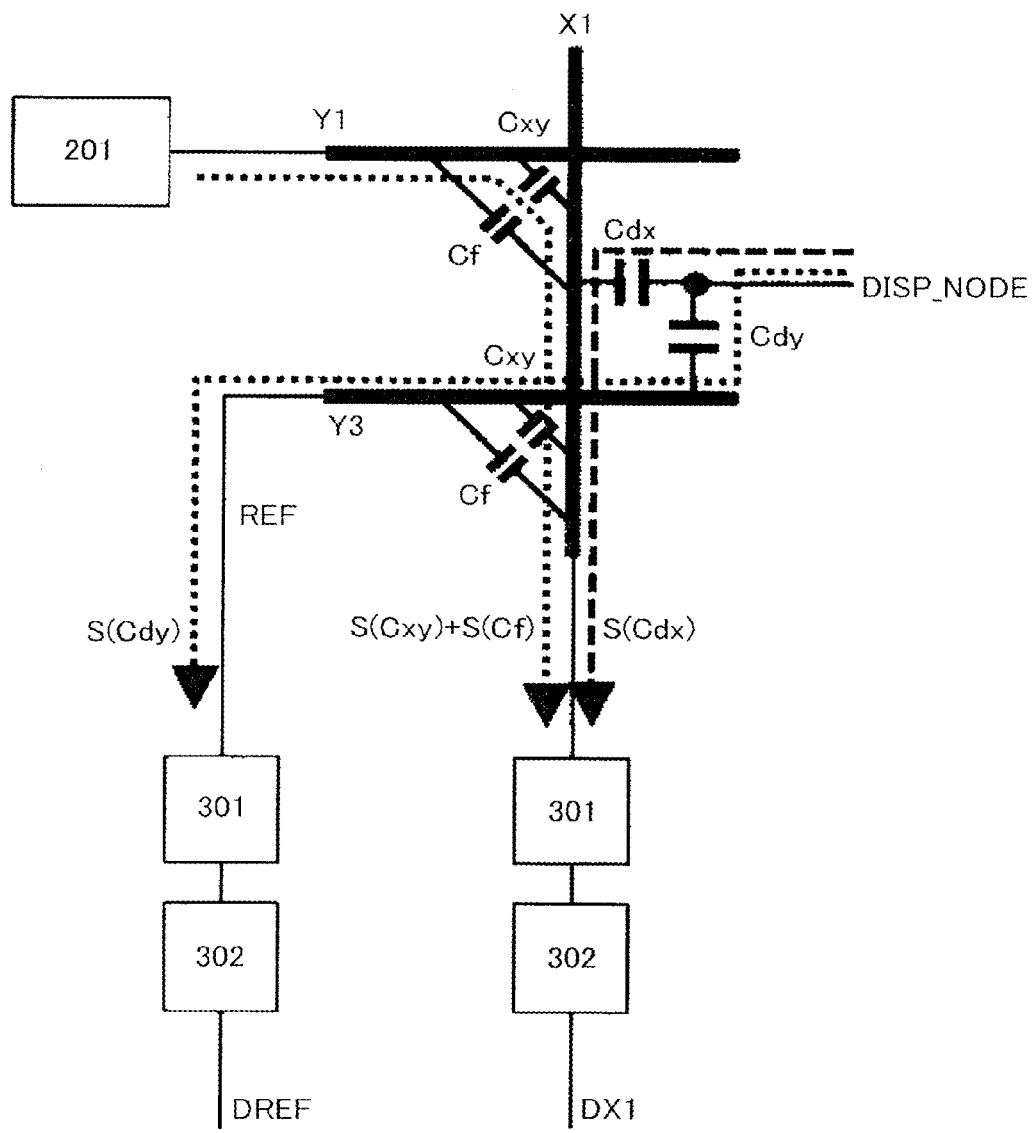
FIG. 6 is a schematic diagram of a case where a finger or the like is in contact with the coordinate input device according to the first embodiment of the invention.

Next, FIG. 5 is a schematic diagram of a case where a contact of a finger or the like does not exist in the coordinate input device according to the first embodiment of the invention, and FIG. 6 is a schematic diagram of a case where a finger or the like is in contact with the coordinate input device according to the first embodiment of the invention. Hereinafter, a detection operation of the coordinate input device according to the first embodiment will be described with reference to FIGS. 5 and 6. Here, the schematic diagrams illustrated FIGS. 5 and 6 are schematic diagrams of signal paths in the scanning period Ty1 at which the drive signal is applied to the selective electrode Y1 and the selective electrode Y3 is selected as the reference electrode in FIG. 4. In addition, in FIGS. 5 and 6, the drive switch DSL_Y1 which is in the selected state so as to connect the drive circuit 201 to the selective electrode Y1, and the reference switch RSL_Y3 that connects the selective electrode Y3 to the reference signal wire REF are omitted.

In the case where a contact with a finger or the like does not exist, as illustrated in FIG. 5, capacitances in the vicinities of the intersections between the selective electrodes Y1 and Y3 and the detection electrode X1 are mainly intersection capacitances Cxy between the selective electrodes and the detection electrodes. In addition, a parasitic capacitance Cdx exists between a wire DISP_NODE such as a signal line or a scanning line included in the display panel 106 and the detection electrode X1. A parasitic capacitance Cdy also exists between the selective electrode Y1 or Y3 and the wire DISP_NODE included in the display panel 106. Here, the parasitic capacitance Cdy existing at the selective electrode Y1 is not illustrated. This is because the parasitic capacitance Cdy existing at the selective electrode Y1 is mainly charged and discharged from the drive circuit 201 and the wire DISP_NODE of the display panel 106 and thus rarely affects the signal detection circuit 301.

When the pulse-shaped drive signal is input to the selective electrode Y1 from the drive circuit 201, the intersection capacitance Cxy is charged and discharged by the selective electrode Y1, so that a charge and discharge current S(Cxy) flows through the detection electrode X1 via the intersection capacitance Cxy. Here, the signal detection circuit 301 detects the charge and discharge current S(Cxy) flowing via the intersection capacitance Cxy as a signal. The signal detection circuit 301 that detects the signal from the detection electrode X1 detects the charge and discharge current S(Cxy) of the intersection capacitance Cxy and also detects a charge and discharge current S(Cdx) flowing through the detection electrode X1 via Cdx as the parasitic capacitance Cdx existing between the detection electrode X1 and the wire DISP_NODE of the display panel 106 is charged and discharged by the wire DISP_NODE which is changed by a display operation. Therefore, the signal detection circuit 301 connected to the detection electrode X1 also detects the signal S(Cdx) flowing via the parasitic capacitance Cdx which becomes noise, as well as the signal S(Cxy) corresponding to the capacitance in the vicinity of the intersection which is originally an object to be detected.

On the other hand, since the reference electrode (here, the selective electrode Y3) is not connected to the drive circuit 201, a signal having the capacitance in the vicinity of the intersection does not exist. Therefore, a charge and discharge current S(Cdy) flows through the reference electrode Y3 via the parasitic capacitance Cdy when the parasitic capacitance Cdy is charged and discharged from the wire DISP_NODE of the display panel 106. Therefore, the signal detection circuit 301 connected to the reference electrode Y3 only detects the signal S(Cdy) having the parasitic capacitance Cdy which becomes noise.

As described above, by detecting the signal from the reference electrode, it is possible to detect the noise component from the display panel 106 or the like. Accordingly, the noise component S(Cdx) included in the detection electrode X1 can be cancelled on the basis of the digital output signal DREF, so that it is possible to measure the signal S(Cxy) according to the capacitance in the vicinity of the intersection with good precision.

Next, the case where a contact with a finger or the like exists will be described. Here, in the following description, a case where electrostatic capacitances Cf occur due to the contact with the finger or the like in the vicinities of the detection electrode X1 and the selective electrodes Y1 and Y3.

As illustrated in FIG. 6, as the pulse-shaped drive signal is applied to the selective electrode Y1 from the drive circuit 201, the intersection capacitance Cxy and the electrostatic capacitance Cf of the finger are charged and discharged by the selective electrode Y1, so that charge and discharge currents respectively flow via the intersection capacitance Cxy and the electrostatic capacitance Cf through the detection electrode X1. That is, a charge and discharge current S(Cxy)+S(Cf), which is the sum of the charge and discharge current S(Cxy) flowing via the intersection capacitance Cxy and the charge and discharge current S(Cf) flowing via the electrostatic capacitance Cf, flows through the detection electrode X1. Therefore, the signal detection circuit 301 detects the charge and discharge current S(Cxy)+S(Cf), which is the sum of the charge and discharge current S(Cxy) flowing via the intersection capacitance Cxy and the charge and discharge current S(Cf) flowing via the electrostatic capacitance Cf, as a signal. The signal detection circuit 301 that detects the signal from the detection electrode X1 detects the charge and discharge currents of the intersection capacitance and the electrostatic capacitance, and also detects the charge and discharge current S(Cdx) flowing through the detection electrode X1 via Cdx as the parasitic capacitance Cdx existing between the detection electrode X1 and the wire DISP_NODE of the display panel 106 and being charged and discharged by the display operation. Therefore, the signal detection circuit 301 connected to the detection electrode X1 also detects the signal S(Cdx) which is obtained via the parasitic capacitance Cdx which becomes noise, as well as the signal S(Cxy)+S(Cf) corresponding to the capacitance in the vicinity of the intersection which should be detected.

On the other hand, the reference electrode (here, the selective electrode Y3) is not connected to the drive circuit 201, so that a signal having the capacitances Cxy and Cf in the vicinity of the intersection does not exist. The charge and discharge current S(Cdy) flows through the reference electrode Y3 via the parasitic capacitance Cdy when the parasitic capacitance Cdy is charged or discharged from the wire DISP_NODE of the display panel 106. Therefore, even in a case where there is an Increase in electrostatic capacitance due to the contact on the reference electrode, the signal detection circuit 301 connected to the reference electrode Y3 detects only the signal S(Cdy) having the parasitic capacitance Cdy which becomes noise. Accordingly, by detecting the signal from the reference electrode, it is possible to detect the noise component from the display panel 106 or the like. Therefore, the noise component S(Cdx) included in the detection electrode X1 can be cancelled on the basis of the digital output signal DREF, it is possible to measure the signal S(Cxy) corresponding to the capacitance in the vicinity of the intersection with good precision.

[Detection Operation at Contact Point Position]

Figure 7:
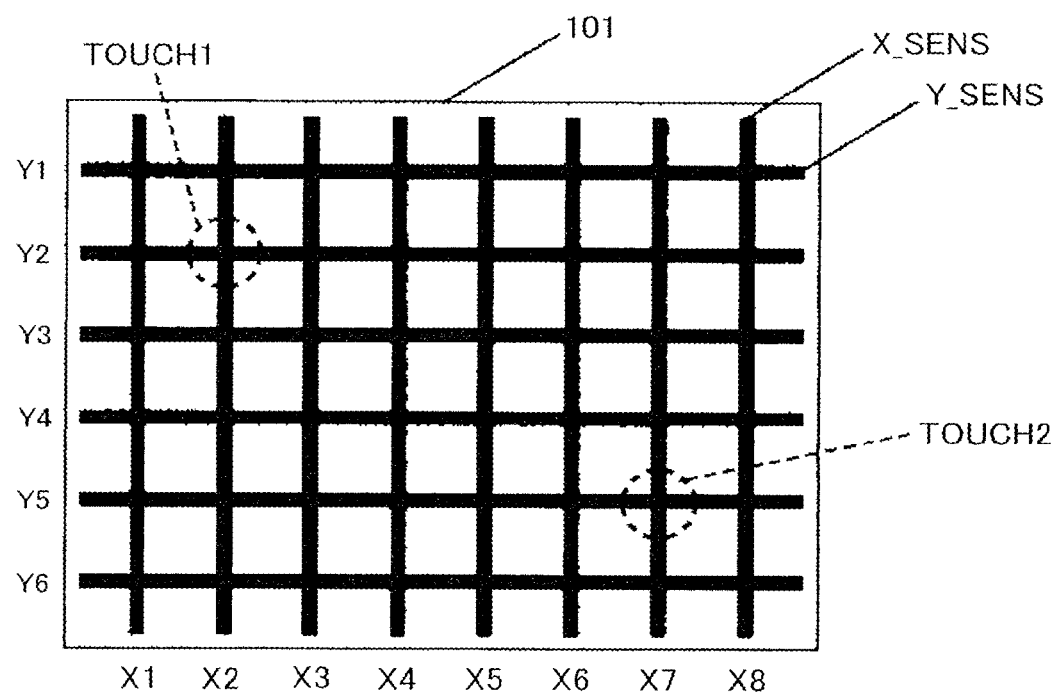
FIG. 7 is a schematic diagram of a case where a contact exists on a coordinate input unit according to the first embodiment of the invention.
Figure 8:
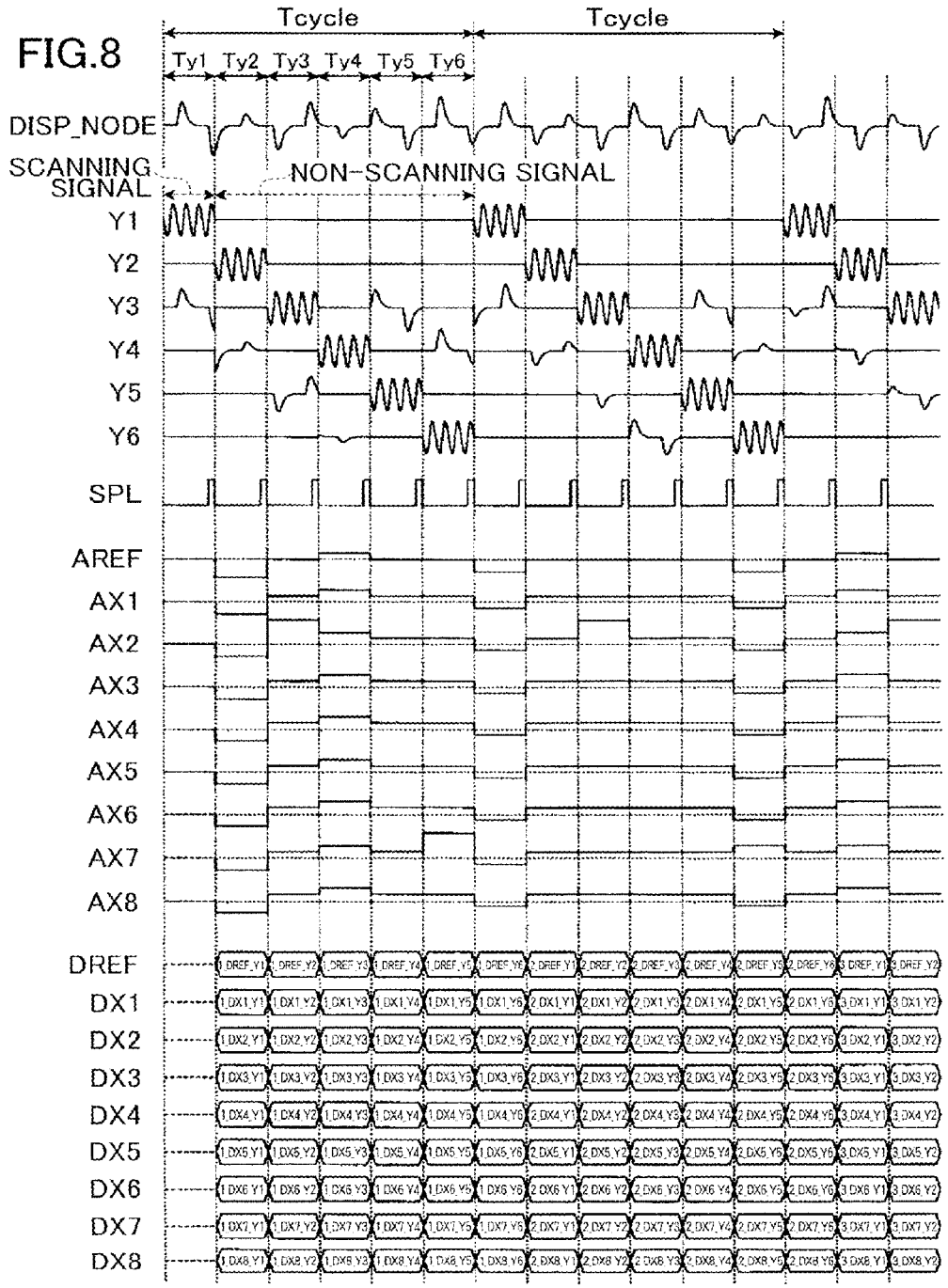
FIG. 8 is a timing chart illustrating voltage waveforms of selective electrodes, control signals, and the like in the case where the contact exists as illustrated in FIG. 7.
Figure 9:
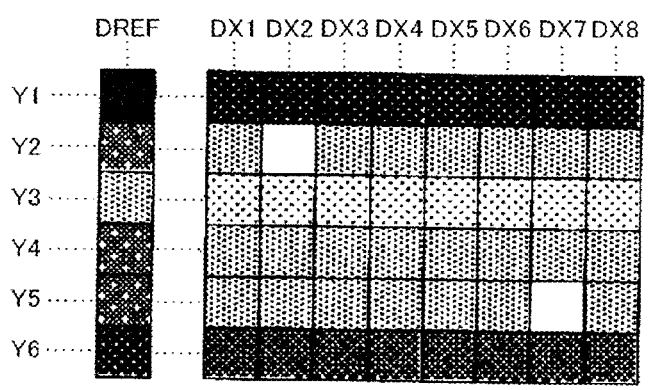
FIG. 9 is a schematic diagram of the strength of the digital output signals in a first cycle Tcycle illustrated in FIG. 8.
Figure 9:
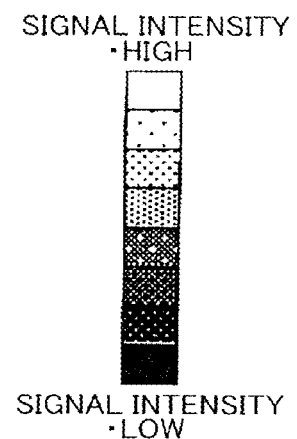
Figure 10:
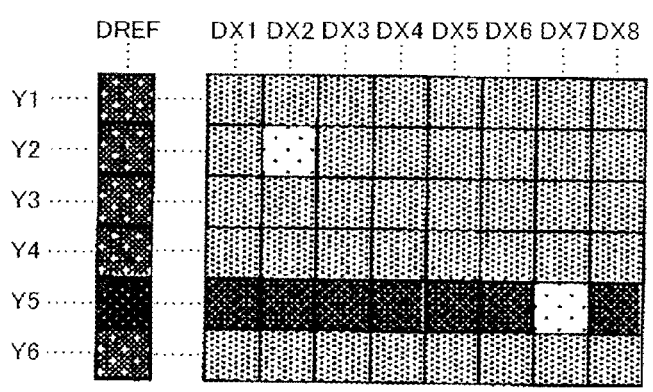
FIG. 10 is a schematic diagram of the strength of the digital output signals in a second cycle Tcycle illustrated in FIG. 8.
Figure 10:
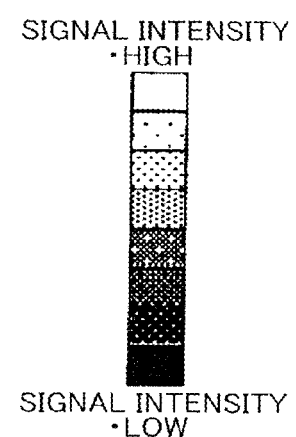
Figure 11:
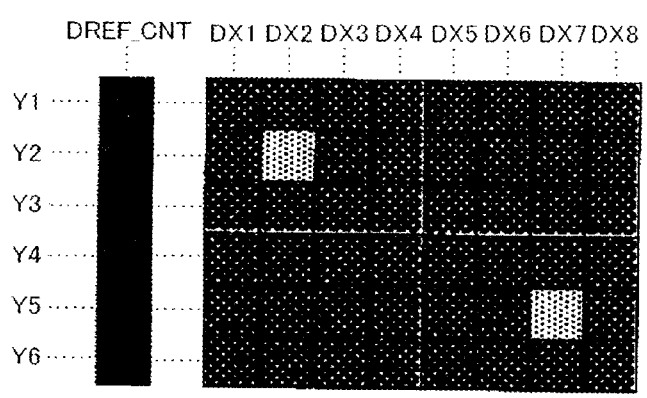
FIG. 11 is a schematic diagram of the strength of the digital output signals after a correction process is performed in the coordinate input device according to the first embodiment of the invention.
Figure 11:
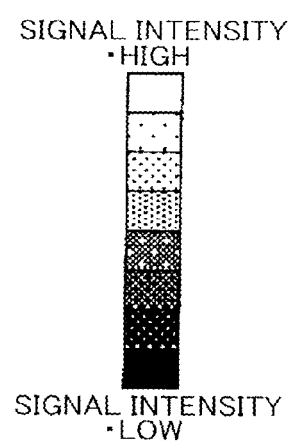

Next, FIG. 7 is a schematic diagram of a case where a contact exists on the coordinate input unit 101 according to the first embodiment of the invention, FIG. 8 is a timing chart illustrating the voltage waveforms of selective electrodes, the control signals, and the like in the case where the contact exists as illustrated in FIG. 7, FIG. 9 is a schematic diagram of the strength of the digital output signals in the first cycle Tcycle illustrated in FIG. 8, FIG. 10 is a schematic diagram of the strength of the digital output signals in a second cycle Tcycle illustrated in FIG. 8, and FIG. 11 is a schematic diagram of the strength of the digital output signal after a correction process is performed in the coordinate input device according to the first embodiment of the invention. Hereinafter, a detection operation performing when coordinates are input will be described with reference to FIGS. 7 to 11. Here, in the following description, a case where two contacts (contact points) including a contact TOUCH1 that occurs in the vicinity of an intersection of the selective electrode Y2 and the detection electrode X2 of the coordinate input unit 101 and a contact TOUCH2 that occurs in the vicinity of an intersection of the selective electrode Y5 and the detection electrode X7 exist will be described; however, contact positions and the number of contacts are not limited to those.

The wire DISP_NODE included in the display panel 106 is changed according to the display operation. In addition, in many cases, a cycle in which DISP_NODE is changed is not in synchronization with the scanning periods of the coordinate input device, so that noise that is generated due to the change in DISP_NODE varies depending on the detection cycle Tcycle and the scanning period Ty of the coordinate input device. Therefore, the display apparatus according to the first embodiment of the invention selects the reference electrode from the selective electrodes to which the drive signal is not applied in each scanning period in the detection cycle Tcycle, and detects a noise signal flowing via the reference signal, thereby accommodating the case where noise from the display panel 106 changes through time. Hereinafter, the detection operation performed at the contact point position will be described in detail.

In the coordinate input device according to the first embodiment, the drive signal is applied to the selective electrode Y1 and the selective electrode Y3 is selected as the reference electrode in the scanning period Ty1. At the subsequent scanning period Ty2, the drive signal is applied to the selective electrode Y2, and the selective electrode Y4 is selected as the reference electrode. At the scanning period Ty3, the drive signal is applied to the selective electrode Y3, and the selective electrode Y5 is selected as the reference electrode. At the scanning period Ty4, the drive signal is applied to the selective electrode Y4, and the selective electrode Y6 is selected as the reference electrode. At the scanning period Ty5, the drive signal is applied to the selective electrode Y5, and the selective electrode Y3 is selected as the reference electrode. At the scanning period Ty6, the drive signal is applied to the selective electrode Y6, and the selective electrode Y4 is selected as the reference electrode. The scanning periods Ty1 to Ty6 constitute the one period Tcycle, and the one period Tcycle is repeated, so that as described in the paragraph of a basic operation for noise reduction described above, the noise signal due to DISP_NODE in each of the scanning cycle can be detected as the analog output signal AREF.

Here, as illustrated in FIG. 8, according to the first embodiment, the analog signal detected in the scanning period Ty1 is sampled by the sampling control signal SPL, so that the analog output signals AREF and AX1 to AX8 output to the AD conversion circuit in the scanning period Ty1 are output in the scanning period Ty2 which is the subsequent scanning period. The analog output signals AX1 to AX8 of the respective detection electrodes become signals which is the superposition of the noise signal detected as the analog output signal AREF and the signal that depends on both the capacitances at the intersections and the electrostatic capacitances due to the input. The AD conversion circuit 302 converts the analog output signals which are detected by the signal detection circuit 301 to be sampled and held into digital signals and outputs the digital signals as the digital signals DREF and DX1 to DX8 to the input coordinate computing circuit 104. Here, the signals output as the digital signals DREF and DX1 to DX8 are represented as illustrated at the lower end of FIG. 8. For example, the digital signals DREF corresponding to the scanning period Ty1 are represented as 1_DREF_Y1 to 1_DREF_Y6, and the digital signals DX1 are represented as 1_DX1_Y1 to 1_DX1_Y6.

With regard to the digital output signals measured as described above in the first cycle Tcycle, as illustrated in FIG. 9, the digital output signal DX2 detected from the detection electrode X2 at the period at which the scanning signal is input to the selective electrode Y2, and the digital output signal DX7 detected from the detection electrode X7 at the period at which the scanning signal is input to the selective electrode Y5 have the greatest signal intensities. As such, with regard to the digital output signals at the second cycle Tcycle, as illustrated in FIG. 10, the digital output signal DX2 detected from the detection electrode X2 at the period at which the scanning signal is input to the selective electrode Y2, and the digital output signal DX7 detected from the detection electrode X7 at the period at which the scanning signal is input to the selective electrode Y5 have the greatest signal intensities.

Here, the signal intensities of the digital output signals DX1 to DX8 measured in the first cycle Tcycle and the second cycle Tcycle are different because the digital output signal DREF corresponding to the noise of each of the cycles varies and DREF varies at each period of the scanning cycles. However, as described above, the digital output signals DX1 to DX8 detected from the respective detection electrodes X1 to X8 are signals in which the signal corresponding to noise is overlapped with the signals corresponding to the capacitances at the intersections and the electrostatic capacitances due to the input. Therefore, as the input coordinate computing circuit 104 performs correction using a well-known correction computation that cancels noise on the basis of DREF corresponding to the noise, it is possible to detect the capacitances with good precision.

For example, in the case where the intensity of the noise incorporated into the detection electrodes is substantially the same as the intensity of the noise detected by the reference electrode, as shown in the detection result of the digital output signals of FIG. 9 or 10, a capacitance detection result can be obtained by subtracting DREF corresponding to the noise from the detection result DX in the vicinity of each intersection. And the Influence of the noise from the display panel 106 as illustrated in FIG. 11 is reduced. Accordingly, it is possible to enhance the capacitance detection precision, so that it is possible to calculate the input coordinates with good precision. In addition, in the case where the intensity of the noise incorporated into the detection electrode is different from the intensity of the noise detected by the reference electrode, the correction process is performed on DREF so that they become substantially the same, and by performing the same process, the capacitance detection with good precision can be realized.

[Selection Method of Reference Electrode]

FIG. 12 is a diagram for explaining another selection method of the reference electrode used in the coordinate input device according to the first embodiment of the invention. Here, since the case where the number of reference electrodes is one illustrated in the FIG. 12 is described above, a case where the number of reference electrodes is two will be described particularly in the following description.

As illustrated in FIG. 12, in the scanning period Ty1, for the driven selective electrode Y1, the selective electrodes Y3 and Y5 are selected as the reference electrodes. In the subsequent scanning period Ty2, for the driven selective electrode Y2, the selective electrodes Y4 and Y6 are selected as the reference signals. Hereinafter, in the same manner, the selective electrode is selected as the first reference electrode so as to have a space of the single selective electrode from the driven selective electrode Y2, and the selective electrode is selected as the second reference electrode so as to have a space of the single selective electrode from the first reference electrode. As such, in this configuration, as the space is provided between the driving electrode and the first reference electrode, incorporation of an influence of the charge and discharge of the driving electrode into the reference electrode can be prevented. In addition, as the space is provided between the first and second reference electrodes, incorporation of the influence of noise into the one reference electrode into the other reference electrode can be prevented.

In addition, although the space of the single selective electrode is provided, the space may have a distance of plural selective electrodes. In addition, although the case where the number of reference electrodes is one and the case where the number thereof is two are shown in FIG. 12, the number of reference electrodes selected is not limited to this and may be three or more. Here, in the case where the number of reference electrodes is plural, when the digital output signal DREF corresponding to noise changes due to the number of reference electrodes, the correction process corresponding to the noise from each of the detection electrodes X1 to X8 may be performed by, for example, the input coordinate computing circuit 104.

FIG. 13 is a diagram for explaining another selection method of the reference electrode used in the coordinate input device according to the first embodiment of the invention.

As illustrated in FIG. 13, when the number of selective electrodes selected as the reference electrodes is one, one is selected as the reference electrode from among the selective electrodes adjacent to the selective electrode which is the driving electrode. In addition, when the number of reference electrodes selected as the reference electrodes is two, the two selective electrodes adjacent to the selective electrode which is the driving electrode are selected as the reference electrodes. Moreover, in a case where the number of selective electrodes selected as the reference electrodes is three or more, the two selective electrodes adjacent to the selective electrode which is the driving electrode are selected as the reference electrodes, and the selective electrode adjacent to these reference electrodes is selected as the reference electrode, so that a desired number of selective electrodes can be selected as the reference electrodes. With such a configuration, it is possible to cause the driving electrode that detects the capacitance at the intersection and the reference electrode that measures noise to be close to each other, so that the noise can be measured more accurately when noise has location dependency, so that it is possible to enhance the detection precision. In addition, in FIG. 13, the case where the number of reference electrodes is one to four is illustrated. However, the number of selective electrodes selected as the reference electrodes is not limited to this and may be five or more. In addition, in the case where the number of reference electrodes is plural, when the digital output signal DREF corresponding to the noise changes due to the number of reference electrodes, the correction process corresponding to the noise from each of the detection electrodes X1 to X8 may be performed by the input coordinate computing circuit 104.

As described above, the display apparatus according to the first embodiment has the configuration in which the selective electrodes to which the drive signal is not applied are selected as the reference electrodes from among the selective electrodes included in the coordinate input device to which the drive signal is to be input, the detection signal (the capacitance detection result) detected from the detection electrode is corrected by the signal detected from the reference electrode, so that noise can be reduced from the capacitance detection result and the input coordinates can be calculated with good precision. In addition, the selective electrodes other than the selective electrodes to which the drive signal is input are used as the reference electrodes, and the signal generated due to the noise at the same timing at which the capacitance is detected, so that the noise that varies all the time can be cancelled, thereby enhancing the detection precision. In addition, the detection result of the reference electrode that detects the noise is not changed depending on the increase or decrease in the electrostatic capacitance due to an existence of the input. Therefore, even in the case where the contact position moves on the coordinate input unit 101, the noise cancel can be stably performed, thereby enhancing the detection precision. In addition, since the selective electrode close to the selective electrode that detects the capacitance can be selected as the reference electrode, in a case where there is a distribution of noise, the noise can be measured more accurately, thereby enhancing the detection precision. In addition, special electrodes are not needed for the coordinate input unit 101 as the reference electrodes, so that in a case where the entire display panel 106 is used, a region that limits inputs is not needed, so that designing can be easily performed.

Second Embodiment

Entire Configuration

Figure 14:
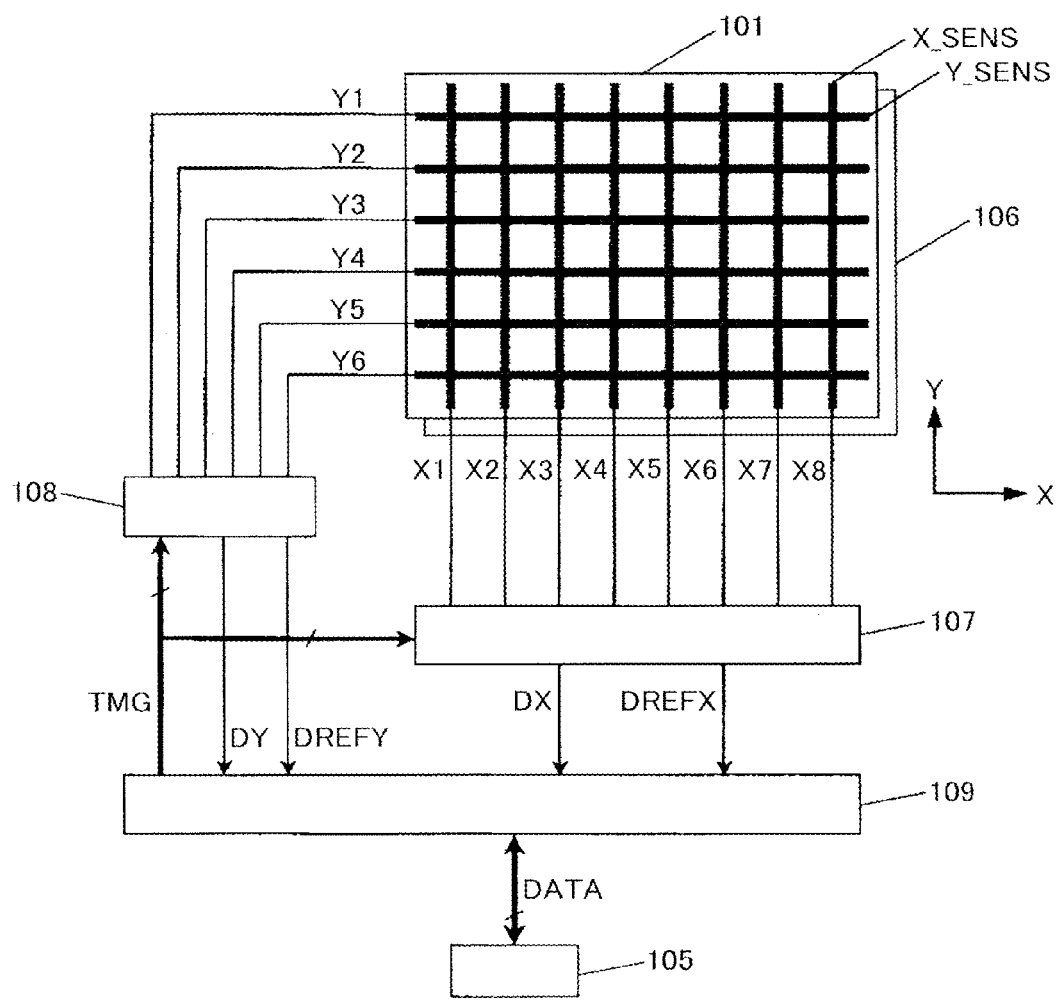
FIG. 14 is a block diagram for explaining the entire configuration of a display apparatus according to the second embodiment.

FIG. 14 is a block diagram for explaining the entire configuration of a display apparatus according to the second embodiment. Hereinafter, the entire configuration of the display apparatus according to the second embodiment will be described with reference to FIG. 14. Here, the configurations of a coordinate input unit 101, a system 105, and a display panel 106 are the same as those of the first embodiment, in the following description, capacitance detection circuits 107 and 108 and an input coordinate computing circuit 109 will be described in detail.

As illustrated in FIG. 14, the coordinate input device according to the second embodiment includes the display panel 106 that displays an image based on display data (not shown) input from the system 105 which is an external apparatus, and a coordinate input device having the coordinate input unit 101 disposed on the display surface side of the display panel 106. The coordinate input device includes the coordinate input unit 101 that indicates an input position, the capacitance detection circuit 107 (second capacitance detection circuit) and the capacitance detection circuit (first capacitance detection circuit) 108 needed that detects input coordinates, and the input coordinate computing circuit 109. Here, the capacitance detection circuit 108 is connected to a plurality of selective electrodes (first detection electrodes) Y_SENS with selective electrode wires Y1 to Y6. In addition, the capacitance detection circuit 107 is connected to a plurality of detection electrodes (second detection electrodes) X_SENS with detection electrode wires X1 to X8. The capacitance detection circuit 107 and the capacitance detection circuit 108 are controlled by a timing control signal group TMG output from the input coordinate computing circuit 109.

Here, in the coordinate input device according to the second embodiment, first, the capacitance detection circuit 107 selects one or more from among the plurality of detection electrodes X_SENS, detects the capacitances of the selected detection electrodes X_SENS, and converts the detected capacitances into a digital signal DX so as to be output to the input coordinate computing circuit 109. Here, the capacitance detection circuit 107 select one or more from among the plurality of detection electrodes X_SENS which do not perform capacitance detection as reference electrodes, and converts the detected signal into a digital signal DREFX as a reference signal for noise so as to be output to the input coordinate computing circuit 109. When the capacitance detection of all the detection electrodes X_SENS is finished, next, capacitance detection of all the selective electrodes Y_SENS is performed by the capacitance detection circuit 108. The capacitance detection circuit 108 selects one or more from among the selective electrodes Y_SENS, detects the capacitances of the selected selective electrodes Y_SENS, and converts the detected capacitances into a digital signal DY so as to be output to the input coordinate computing circuit 109. In addition, as in the capacitance detection circuit 107, the capacitance detection circuit 108 selects one or more from among the plurality of selective electrodes Y_SENS which do not perform capacitance detection as the reference electrodes, and converts the detected signal into a digital signal DREFY as a reference signal for noise so as to be output to the input coordinate computing circuit 109.

Here, the input coordinate computing circuit 109 calculates a contact position in the x direction on the basis of the sequentially input digital signal DX of the capacitance detection of the detection electrode X_SENS and the digital signal DREFX as the reference signal for noise. Next, the input coordinate computing circuit 109 calculates a contact position in the y direction on the basis of the sequentially input digital signal DY of the capacitance detection of the detection electrode Y_SENS and the digital signal DREFY as the reference signal for noise, and outputs the obtained contact positions in the x and y directions to the system 105 as coordinate data.

[Configuration of Capacitance Detection Circuit]

Figure 16:
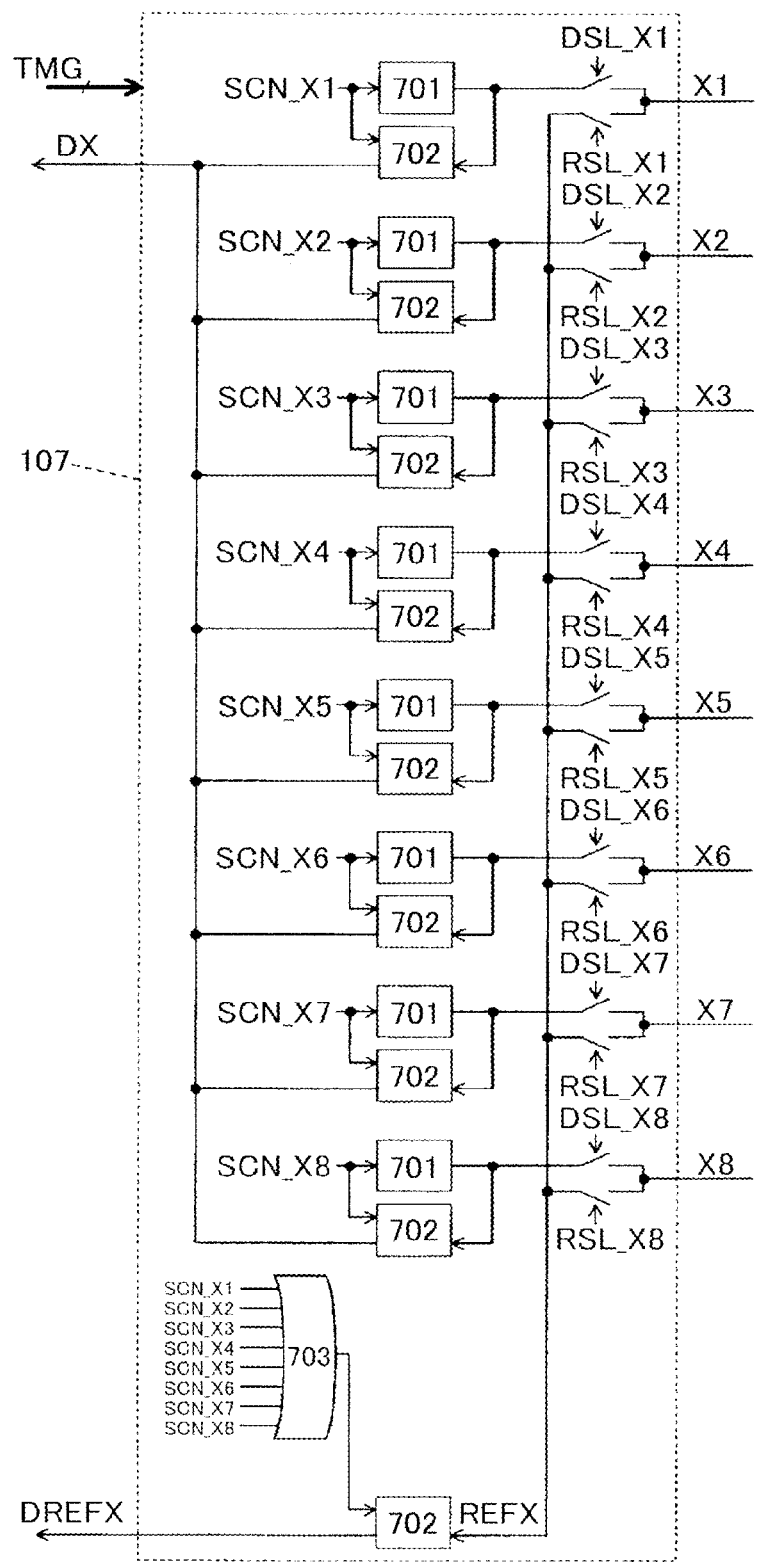
FIG. 16 is a diagram for explaining a schematic configuration of the one capacitance detection circuit in the display apparatus according to the second embodiment of the invention.

FIG. 16 is a diagram for explaining a schematic configuration of the one capacitance detection circuit in the display apparatus according to the second embodiment of the invention. Hereinafter, the one capacitance detection circuit 107 to which the detection electrodes X_SENS which are disposed in parallel in the x direction will be described with reference to FIG. 16.

As illustrated in FIG. 16, the capacitance detection circuit 107 according to the second embodiment includes, for the detection electrodes X_SENS that performs the capacitance detection, drive circuits 701 that applies a drive signal, signal detection circuits 702 that detect a signal of the detection electrode X_SENS, drive switches DSL_X1 to DSL_X8 that connect the detection electrodes X_SENS to the respective drive circuits 701, reference switches RSL_X1 to RSL_X8 that connect the detection electrodes X_SENS to a respective reference signal wire REFX, and an OR circuit 703. Selection timing signals SCN_X1 to SCN_X8 of a timing control signal group TMG are input to the capacitance detection circuit 107, so that the drive circuits 701 for the capacitance detection of each of the detection electrodes X_SENS and the signal detection circuits 702 are controlled by the selection timing signals SCN_X1 to SCN_X8 of the timing control signal group TMG.

Next, operations of the capacitance detection circuit 107 according to the second embodiment will be described with reference to FIGS. 14 and 16. For example, in a case where the capacitance detection of the detection electrode X1 from among the plurality of detection electrodes X_SENS is performed, the drive circuit 701 and the signal detection circuit 702 corresponding to the selection timing signal SCN_X1 are in a selected state. In addition, the drive switch DSL_X1 is in the selected state such that the detection electrode X1 is connected to the drive circuit 701 and the signal detection circuit 702. The selected drive circuit 701 applies the drive signal to the detection electrode X1. Here, in the second embodiment, for example, in a period at which the drive signal is applied to the detection electrode X1, a signal from the detection electrode X1 is detected by the signal detection circuit 702. Thereafter, the signal detection circuit 702 converts the detected current or voltage into the digital signal DX so as to be output. Here, in a case where the capacitance detection of the detection electrode X1 is not performed or the detection electrode X1 is not used as the reference electrode, the drive circuit 701 and the signal detection circuit 702 corresponding to the selection timing signal SCN_X1 are in a non-selected state, and thus the detection electrode X1 is set in a floating state. Therefore, in order to release the floating state, it is preferable that a predetermined constant voltage or the like be applied to the detection electrode X1 by the drive circuit 701. In addition, driving of the drive circuit 701 may be voltage driving or current driving. In addition, the signal detected by the signal detection circuit 702 may be a current flowing through the detection electrode X1 or a voltage of the detection electrode X1. For example, the drive circuit 701 may charge the detection electrode X1 from a certain constant voltage to a drive voltage, and thereafter the signal detection circuit 702 detects a current that is discharged until the detection electrode X1 reaches the certain constant voltage. Thereby the capacitance of the detection electrode X1 is detected.

On the other hand, according to the second embodiment, one or more are selected from among the plurality of detection electrodes X1 to X8 which do not perform the capacitance detection as the reference electrodes for noise measurement. For example, at a scanning period at which the capacitance detection of the detection electrode X1 is performed, the adjacent detection electrode X2 is selected as the reference electrode. In this case, the reference switch RSL_X2 is set in the selected state, and the drive switch DSL_X2 is set in the non-selected state such that the detection electrode X2 is connected to the reference signal wire REFX. The reference signal wire REFX is connected to the signal detection circuit 702, and the signal detection circuits for the reference electrode are operated during the capacitance detection of the detection electrodes X1 to X8, so that the reference signal wire REFX is controlled by an output of the OR circuit 703 of the selection timing signals SCN_X1 to SCN_X8. Therefore, here, signal detection of the reference electrode X2 is performed similarly to the capacitance detection of the detection electrode X1. Here, the drive signal is not supplied to the reference electrode by the drive circuit 701 that detects the capacitance of the detection electrode. As such, the capacitance detection circuit 107 selects the detection electrodes X1 to X8 that sequentially perform the capacitance detection by the selection timing signals SCN_X1 to SCN_X8 and the reference electrodes from among the detection electrodes which do not perform the capacitance detection. In addition, a selection method of the reference electrodes in this case may apply the selection method described in the paragraph of the selection method of the reference electrode as in the first embodiment described above.

Figure 15:
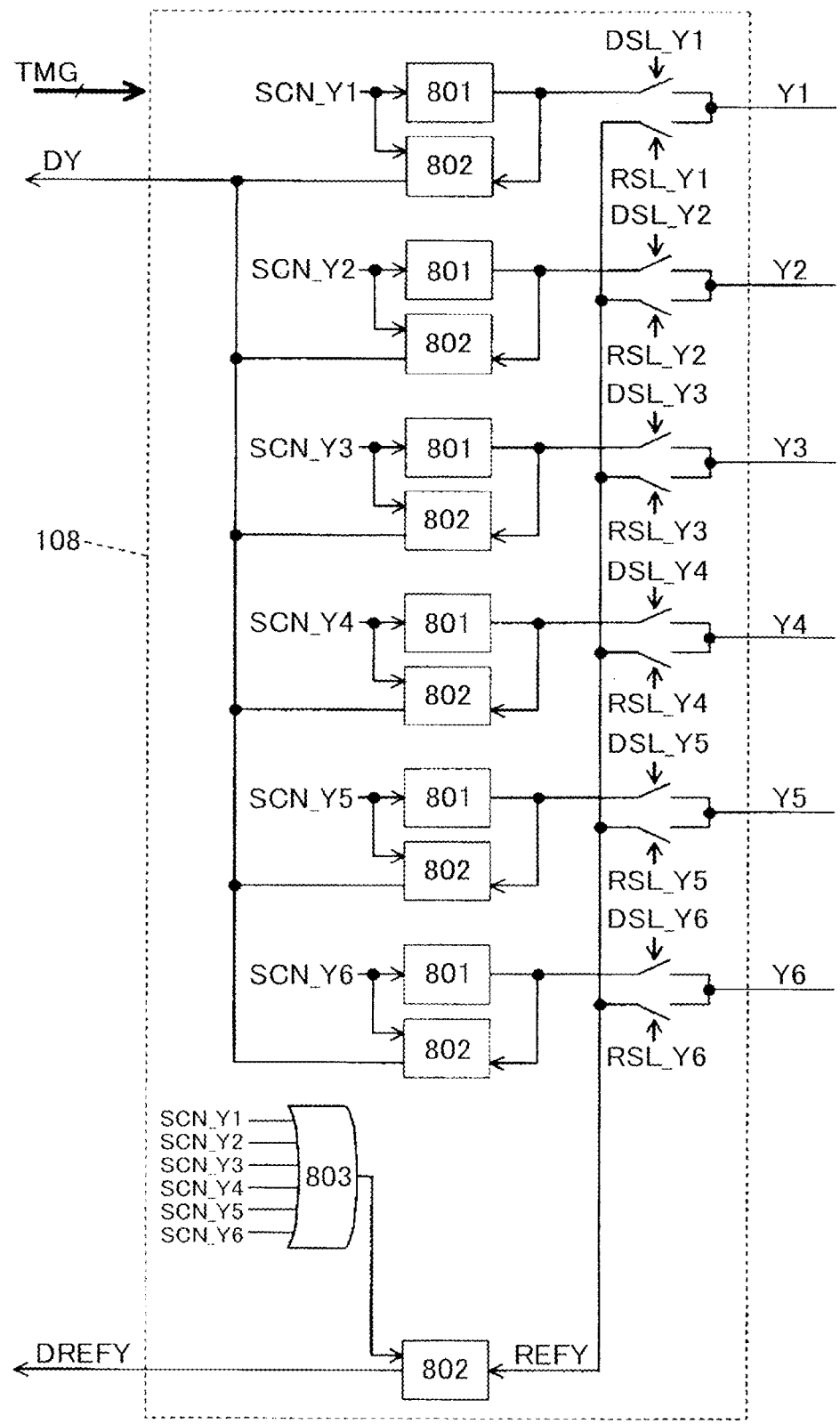
FIG. 15 is a diagram for explaining a schematic configuration of the other capacitance detection circuit in the display apparatus according to the second embodiment of the invention.

Next, FIG. 15 is a diagram for explaining a schematic configuration of the other capacitance detection circuit in the display apparatus according to the second embodiment of the invention. Hereinafter, the other capacitance detection circuit to which the selective electrodes Y_SENS are disposed parallel in the y direction will be described with reference to FIG. 15. In addition, a basic configuration of the capacitance detection circuit 108 according to the second embodiment is the same as that of the capacitance detection circuit 107.

As illustrated in FIG. 15, the capacitance detection circuit 108 according to the second embodiment includes, for the selective electrodes Y_SENS that perform the capacitance detection, drive circuits 801 that apply a drive signal, signal detection circuits 802 that detect a signal of the selective electrode Y_SENS, drive switches DSL_Y1 to DSL_Y6 that connect the respective selective electrodes Y to the respective drive circuits, reference switches RSL_Y1 to RSL_Y6 that connect the respective selective electrodes Y to a respective reference signal wire REFY, and an OR circuit 803. Selection timing signals SCN_Y1 to SCN_Y6 of a timing control signal group TMG are input to the capacitance detection circuit 108, so that the drive circuits 801 for the capacitance detection of the selective electrodes Y_SENS and the signal detection circuits 802 are controlled by the selection timing signals SCN_Y1 to SCN_Y6 of the timing control signal group TMG.

Next, operations of the capacitance detection circuit 108 according to the second embodiment will be described with reference to FIGS. 14 and 15. For example, in a case where the capacitance detection of the selective electrode Y1 from among the plurality of selective electrodes Y_SENS is performed, the drive circuit 801 and the signal detection circuit 802 corresponding to the selection timing signal SCN_Y1 are in the selected state. In addition, the drive switch DSL_Y1 is in the selected state such that the selective electrode Y1 is connected to the drive circuit 801 and the signal detection circuit 802. The selected drive circuit 801 applies the drive signal to the selective electrode Y1. Here, as in the capacitance detection circuit 107, a signal from the selective electrode Y1 is detected by the signal detection circuit 802 in this period. Thereafter, the signal detection circuit 802 converts the detected current or voltage into the digital signal DY so as to be output. Here, in a case where the capacitance detection of the selective electrode Y1 is not performed, the drive circuit 801 and the signal detection circuit 802 corresponding to the selection timing signal SCN_Y1 are in the non-selected state, and thus the selective electrode Y1 is set in a floating state. Therefore, in order to release the floating state, it is preferable that a predetermined constant potential or the like be applied to the selective electrode Y1 by the drive circuit 801. In addition, driving of the drive circuit 801 may be voltage driving or current driving as in the drive circuit 701. In addition, the signal detected by the signal detection circuit 802 may be a current flowing through the selective electrode Y1 or a voltage of the selective electrode Y1. For example, the drive circuit 801 may charge the selective electrode Y1 from a certain constant voltage to a drive voltage, and thereafter the signal detection circuit 802 detects a current that is discharged until the selective electrode Y1 reaches the certain constant voltage, thereby the capacitance of the selective electrode Y1 is detected.

On the other hand, also in the capacitance detection circuit 108 according to the second embodiment, one or more are selected from among the plurality of selective electrodes Y1 to Y6 which do not perform the capacitance detection as the reference electrodes for noise measurement. For example, in a scanning period at which the capacitance detection of the selective electrode Y1 is performed, the adjacent selective electrode Y2 is selected as the reference electrode. In this case, the reference switch RSL_Y2 is set in the selected state, and the drive switch DSL_Y2 is set in the non-selected state such that the selective electrode Y2 is connected to the reference signal wire REFY. The reference signal wire REFY is connected to the signal detection circuit 802, and the signal detection circuits for the reference electrode are operated during the capacitance detection of the selective electrodes Y1 to Y6, so that the reference signal wire REFY is controlled by an output of the OR circuit 803 of the selection timing signals SCN_Y1 to SCN_Y6. Therefore, here, signal detection of the reference electrode Y2 is performed similarly to the capacitance detection of the selective electrode Y1. Here, the drive signal is not supplied to the reference electrode by the drive circuit 801 that detects the capacitance of the selective electrode. As such, the capacitance detection circuit 108 selects both the selective electrodes Y that sequentially perform the capacitance detection by the selection timing signals SCN_Y1 to SCN_Y6 and the reference electrodes from among the selective electrodes which do not perform the capacitance detection. In addition, a selection method of the reference electrodes in this case may apply the selection method described in the section "the selection method of the reference electrode" as in the capacitance detection circuit 107.

[Noise Reduction Operation]

Figure 17:
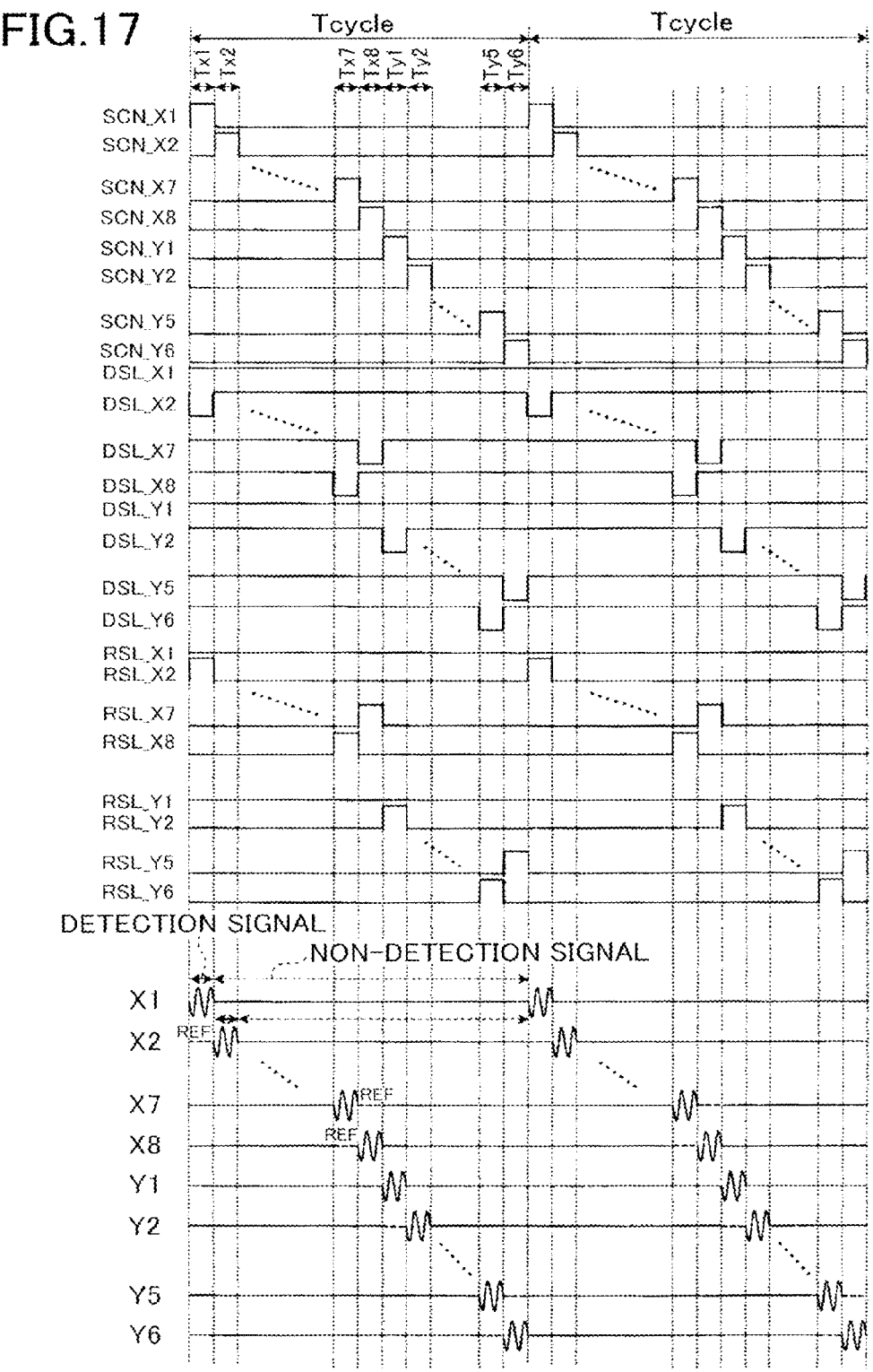
FIG. 17 is a timing chart of voltage waveforms of selective electrodes Y_SENS and detection electrodes X_SENS and control signals included in a timing control signal group TMG in the display apparatus according to the second embodiment of the invention.
Figure 20:
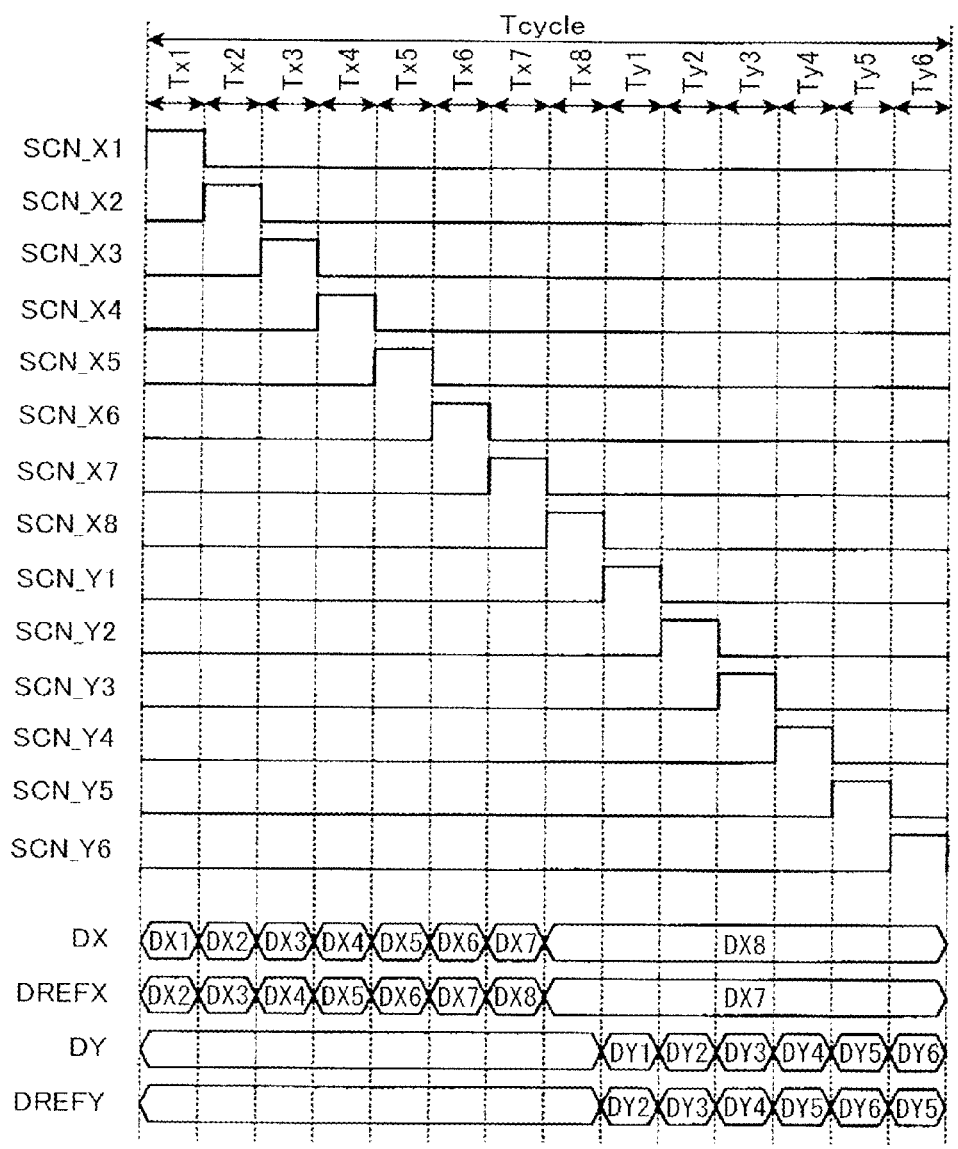
FIG. 20 is a timing chart of the selection timing signals and the digital output signals DX, DREFX, DY, and DREFY in the single cycle in the display apparatus according to the second embodiment of the invention.

Next, FIG. 17 is a timing chart of voltage waveforms of the selective electrodes Y_SENS and the detection electrodes X_SENS and control signals included in a timing control signal group TMG in the display apparatus according to the second embodiment of the invention. FIG. 20 is a timing chart of the selection timing signals and the digital output signals DX, DREFX, DY, and DREFY in the single cycle in the display apparatus according to the second embodiment of the invention. Hereinafter, operations of the coordinate input device according to the second embodiment will be described with reference to FIGS. 17 and 20. Here, in the following description, a case where the number of detection electrodes X_SENS or selective electrodes Y_SENS that perform the capacitance detection at each of the scanning periods Tx1 to Tx8 or Ty1 to Ty6 is one is described. However, the number of detection electrodes or selective electrodes that perform the capacitance detection at each of the scanning periods Tx1 to Tx8 or Ty1 to Ty6 may be plural. In addition, in FIG. 17, a case where the coordinate input unit 101 of FIG. 14 performs the capacitance detection sequentially on the selective electrodes Y_SENS from the upper side of the figure and on the detection electrodes X_SENS from the left side of the figure; however, the invention is not limited thereto, and the capacitance detection may be sequentially performed thereon from the lower side or from the right side of the figure.

As illustrated in FIG. 17, the coordinate input device according to the second embodiment sequentially selects the selective electrodes Y_SENS and the detection electrodes X_SENS at the periods of the single cycle Tcycle and detects a capacitance of each electrode. In addition, one is selected from among the detection electrodes X_SENS or the selective electrodes Y_SENS that perform the capacitance detection at each of the scanning periods Tx1 to Tx8 and Ty1 to Ty6. Here, the number of electrodes selected to perform the capacitance detection at each scanning period is not limited thereto and may also be plural.

The capacitance detection is performed in a scanning period in which the selection timing signals SCN_X1 to SCN_X8 and SCN_Y1 to SCN_Y6 are the High level. The capacitance detection is not performed in a scanning period in which they are at the Low level and a predetermined constant voltage is applied. For example, in the scanning period Tx1, the detection electrode X1 is selected to detect the capacitance thereof. From the scanning period Tx2, the detection electrodes X2 to X8 and the selective electrodes Y1 to Y6 are sequentially selected to detect the capacitances thereof, thereby the capacitance detection of the entire electrodes on the coordinate input unit 101 is performed.

That is, as illustrated in FIG. 20, in the scanning periods Tx1 to Tx8 and Ty1 to Ty6, one is sequentially selected from among the electrodes which perform the capacitance detection by the scanning timing signals SCN, and the detection result is output. As a result, for example, in the scanning period Tx1, the detection electrode X1 is selected, and the capacitance of the detection electrode X1 is detected, so that a digital signal DX1 of the detected capacitance is output from the capacitance detection circuit 107 to the input coordinate computing circuit 109. Thereafter, selection of the detection electrodes X2 to X8 and detection of the capacitances of the selected detection electrodes X2 to X8 are sequentially performed, so that digital signals DX2 to DX8 of the detection results are sequentially output from the capacitance detection circuit 107 to the input coordinate computing circuit 109. In addition, in the scanning period Ty1 subsequent to the scanning period Tx8, the selective electrode Y1 is selected, and the capacitance of the selective electrode Y1 is detected, so that a digital signal DY1 of the detected capacitance is output from the capacitance detection circuit 108 to the input coordinate computing circuit 109. Thereafter, selection of the selective electrodes Y2 to Y6 and detection of the capacitances of the selected selective electrodes Y2 to Y6 are sequentially performed, so that digital signals DY2 to DY6 of the detection results are sequentially output from the capacitance detection circuit 108 to the input coordinate computing circuit 109. Thereby the single cycle Tcycle is finished. Thereafter, the operations are repeated.

On the other hand, the reference switch control signals RSL_X1 to RSL_X8 and RSL_Y1 to RSL_Y6 select each one of the plurality of detection electrodes X_SENS and the plurality of selective electrodes Y_SENS which do not perform the capacitance detection as the reference electrode in each scanning period. For example, in the scanning period Tx1, the capacitance detection of the detection electrode X1 is performed, and the detection electrode X2 is selected as the reference electrode. In addition, in the scanning period Tx2, the capacitance of the detection electrode X2 is detected, and the detection electrode X3 is selected as the reference electrode. Here, the number of electrodes selected as the reference electrode at each scanning period is not limited to one and may also be plural. In addition, the electrode adjacent to the electrode of which the capacitance is detected is selected as the reference electrode; however, the electrode having a space of one or a plurality of electrodes may also be selected. Here, the drive switch control signals DSL_X1 to DSL_X8 of the detection electrodes selected as the reference electrodes or the drive switch control signals DSL_Y1 to DSL_Y6 corresponding to the selective electrodes may be set in the non-selected state. Here, in FIG. 17, the drive switch control signals and the reference switch control signals at the High level are in the selected state, and the drive switch control signals and the reference switch control signals at the Low level are in the non-selected state.

That is, as illustrated in FIG. 20, in the scanning periods Tx1 to TX8 and Ty1 to TY6, one is selected from among the electrodes other than the electrodes which perform the capacitance detection as the reference electrode, and a noise signal incorporated into the reference electrode is detected. As a result, for example, in the scanning period Tx1, the detection electrode X2 is selected as the reference electrode, and the capacitance of the detection electrode X2 is detected, so that the digital signal DX2 of the detected capacitance is output as the digital signal DREFX from the capacitance detection circuit 107 to the input coordinate computing circuit 109. Thereafter, selection of the detection electrodes X3 to X8 as the reference electrode and detection of the capacitances of the selected detection electrodes X3 to X8 are sequentially performed, so that digital signals DX2 to DX8 of the detection results are sequentially output as the digital signal DREFX from the capacitance detection circuit 107 to the input coordinate computing circuit 109. In addition, in the scanning period Ty1 subsequent to the scanning period Tx8, the selective electrode Y2 is selected as the reference electrode, and the capacitance of the selective electrode Y2 is detected, so that the digital signal DY2 of the detected capacitance is output as the digital signal DREFY from the capacitance detection circuit 108 to the input coordinate computing circuit 109. Thereafter, selection of the selective electrodes Y3 to Y6 and detection of the capacitances of the selected selective electrodes Y2 to Y6 are sequentially performed, so that digital signals DY2 to DY6 of the detection results are sequentially output as the digital signal DREFY from the capacitance detection circuit 108 to the input coordinate computing circuit 109, thereby the single cycle Tcycle is finished. Thereafter, the operations are repeated.

In the single cycle Tcycle including the scanning periods Tx1 to Tx8 and the scanning periods Ty1 to Ty6, by the above operations, the capacitances of the detection electrodes and the selection electrodes are sequentially detected, and at the same time, the reference electrode is selected from among the electrodes of which the capacitances are not detected.

Figure 18:
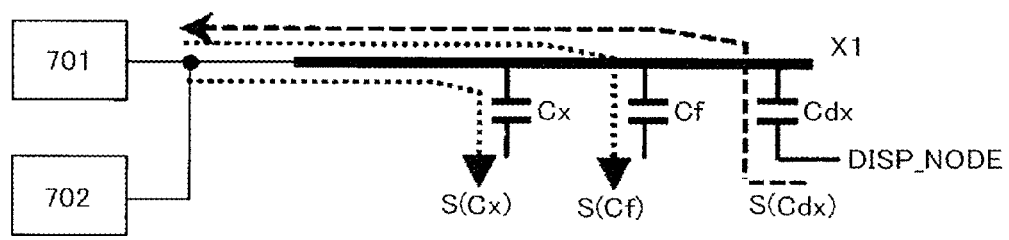
FIG. 18 is a schematic diagram for explaining signal paths of the detection electrode X1 at a scanning period Tx1 in the coordinate input device according to the second embodiment of the invention.
Figure 19:
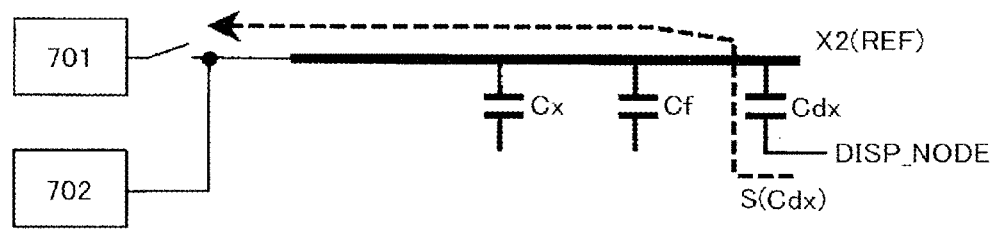
FIG. 19 is a schematic diagram for explaining signal paths of the detection electrodes X3 in the scanning period Tx1 in the coordinate input device according to the second embodiment of the invention.

Next, FIG. 18 is a schematic diagram for explaining signal paths of the detection electrode X1 in the scanning period Tx1 in the coordinate input device according to the second embodiment of the invention, and FIG. 19 is a schematic diagram for explaining signal paths of the detection electrodes X2 in the scanning period Tx1 in the coordinate input device according to the second embodiment of the invention. Hereinafter, the detection operation of the coordinate input device according to the second embodiment will be described with reference to FIGS. 18 and 19. Here, in FIGS. 18 and 19, the drive switch DSL_X1 that connects the drive circuit 701 and the signal detection circuit 702 to the detection electrodes X1 and X2, and the reference switch RSL_X2 that connects the detection electrode X2 to the reference signal wire REFX are omitted.

As illustrated in FIG. 18, since the detection electrode X1 is selected by the selection timing signal SCN_X1 in the scanning period Tx1, the detection electrode X1 is connected to the drive circuit 701 and the signal detection circuit 702. Here, a capacitance Cx is an electrode capacitance of the detection electrode, and a capacitance Cf is an electrostatic capacitance that increases due to a contact or the like. In addition, a capacitance Cdx is a parasitic capacitance existing between the detection electrode and a wire DISP_NODE included in the display panel 106. The drive circuit 701 applies the drive signal to detect the electrode capacitance Cx, the electrostatic capacitance Cf that increases due to a contact or the like. Therefore, signals (currents) S(Cx) and S(Cf) are generated as the drive signal is applied by the drive circuit 702. On the other hand, the parasitic capacitance Cdx is charged and discharged by the wire DISP_NODE of the display panel 106 which is changed due to display contents or the like, thereby generating a signal S(Cdx) from a noise component. Therefore, the signal detection circuit 702 detects, as well as a signal S(Cx)+S(Cf) of the signal flowing via the electrode capacitance Cx and the signal flowing via the electrostatic capacitance Cf added, the signal S(Cdx) from the noise. Here, S(Cdx) illustrates a signal that is generated due to a change in the wire DISP_NODE of the display panel 106, that is, the noise component. Therefore, it is assumed that the wire DISP_NODE of the display panel 106 has a certain voltage, and a signal generated due to the drive signal applied from the drive circuit 701, that is, the signal that is normally generated is not illustrated.

On the other hand, as illustrated in FIG. 19, the detection electrode X2 is selected as the reference electrode in the scanning period Tx1. Therefore, the reference signal wire REFX is not connected to the drive circuit 701 and is connected to the signal detection circuit 702. Accordingly, the signal detection circuit for the reference electrode detects only the noise signal S(Cdx) that is generated as the parasitic capacitance Cdx is charged and discharged due to the change in DISP_NODE. Therefore, the noise component is cancelled from the capacitance detection result DX1 of the detection electrode X1 in the scanning period Tx1 by the detection result DX2 of the reference electrode, so that the electrode capacitance and the electrostatic capacitance of the detection electrode X1 can be detected with good precision. In addition, as illustrated in FIG. 19, even in the case where the electrostatic capacitance increases due to a contact of a finger or the like with the reference electrode that detects noise components, the detected value is not changed. Therefore, even in a case where the contacting object such as the finger moves, noise can be stably cancelled.

As described above, the display apparatus according to the second embodiment has also the configuration in which the electrode to which the drive signal that measures electrode capacitances is not input are used as the reference electrode from among the detection electrodes and the selective electrodes included in the coordinate input device, and in which the detection signal (capacitance detection result) detected from the electrode to which the drive signal is input is corrected using the signal detected as the reference electrode. Therefore, noise can be reduced from the capacitance detection result as in the first embodiment, so that it is possible to calculate the input coordinates with good precision. In addition, the electrode other than the electrode of which the capacitance is to be detected is used as the reference electrode to detect the signal generated due to noise at the same timing at which the capacitance is detected, so that the noise cancel corresponding to the noise that varies all the time can be performed, thereby the detection precision is enhanced. In addition, the detection result of the reference electrode that detects the noise is not changed depending on an increase or decrease in the electrostatic capacitance due to an existence of the input. Therefore, even in a case the contact position on the coordinate input unit 101 moves, it is possible to perform the noise cancel stably, thereby the detection precision is enhanced. Moreover, since the electrode close to the electrode that detects the capacitance can be selected as the reference signal, in a case there is a distribution of noise, the noise can be measured more accurately, thereby the detection precision is enhanced. In addition, special electrodes are not needed for the coordinate input unit 101 as the reference electrodes, so that in a case where the entire display panel 106 is used, a region that limits inputs is not needed, so that designing can be easily performed.

While the invention invented by the inventor has be described in detail on the basis of the exemplary embodiments of the invention, the invention is not limited to the embodiments of the invention and can be modified in various manners without departing from the spirit and scope of the invention.

What is claimed is:

1. A display device with a coordinate input device comprising:
   a display panel,
   a plurality of first detection electrodes disposed in parallel to each other;
   a plurality of second detection electrodes intersecting the first detection electrodes;
   a reference signal wire;
   an electrode drive circuit configured to apply a drive signal to one or more of the first detection electrodes;
   a switching circuit configured to select either a first connection of the electrode drive circuit and the first detection electrode or a second connection of the reference signal wire and the first detection electrode; and a detection circuit configure to detect a signal of the second detection electrode generated by the drive signal;

wherein the detection circuit detects a signal of the reference signal wire as a noise signal of the first detection electrode which is electrically connected with the reference signal wire by the second connection, and further comprising an input coordinate computing circuit configured to correct a detection result of the detection circuit on the basis of the detected noise signal, and to calculates an input coordinate from the corrected detection result.

2. The display device according to claim 1, wherein the first detection electrode which connects to the reference signal wire by the second connection is disposed in parallel to the vicinity of the first detection electrode to which the drive signal is applied.

3. The display device according to claim 1, wherein the detection circuit includes a circuit configured to measure currents or voltages of the plurality of second detection electrodes generated by the drive signal.

4. The display device according to claim 3, wherein the circuit for correcting a detection result includes a circuit configured to calculate a correction value within a predetermined range by adding or subtracting a predetermined value to or from the detection result from the reference signal wire.

5. A display device with a coordinate input device comprising:
a display panel;
a plurality of first detection electrodes disposed in parallel to each other,
a plurality of second detection electrodes intersecting the first detection electrodes,
a reference signal wire;
an electrode drive circuit configured to apply a drive signal to one or more of the first detection electrodes,
a switching circuit configured to select either a first connection of the electrode drive circuit and the first detection electrode or a second connection of the reference signal wire and the first detection electrode; and
a detection circuit configured to detect a signal of the second detection electrode charged by the drive signal and electrically connecting with the reference signal wire,
wherein
the switching circuit selects the first detection electrode as a reference electrode by the second connection,
the detection circuit detects a signal of the reference electrode as a noise signal,
a correcting circuit corrects a detection result of the detection circuit on the basis of the detected the noise signal of the reference electrode, and
further comprising an input coordinate computing circuit that calculates an input coordinate from the corrected detection result.

6. The display device according to claim 5, wherein the reference electrode is the first detection electrode which is disposed parallel to the vicinity of the first detection electrode to which the drive signal is applied.

7. The display device according to claim 5, wherein the detection circuit includes a circuit configure to measure currents or voltages of the plurality of second detection electrodes as the signal of the second detection electrodes.

8. The display device according to claim 7, wherein the corrected detection result includes a correction value within a predetermined range by adding or subtracting a predetermined value to or from the detection result from the reference electrode.

* * * * *